US012084900B2

(12) United States Patent
Duff

(10) Patent No.: US 12,084,900 B2
(45) Date of Patent: Sep. 10, 2024

(54) DOORSTOP WITH A ROPE

(71) Applicant: Robert O. Duff, Apple Valley, MN (US)

(72) Inventor: Robert O. Duff, Apple Valley, MN (US)

( * ) Notice: Subject to any disclaimer, the term of this patent is extended or adjusted under 35 U.S.C. 154(b) by 0 days.

(21) Appl. No.: 17/896,551

(22) Filed: Aug. 26, 2022

(65) Prior Publication Data

US 2024/0068279 A1 Feb. 29, 2024

(51) Int. Cl.
*E05F 5/02* (2006.01)
*E05C 17/54* (2006.01)

(52) U.S. Cl.
CPC .................................... *E05C 17/54* (2013.01)

(58) Field of Classification Search
CPC .......... E05C 17/00; E05C 17/46; E05C 17/54; E05C 17/44; E05C 17/025; E05F 5/02; E05F 5/04; E05F 5/06; E05F 5/00; E05F 2005/046; E05Y 2900/132; E05Y 2201/212; E05Y 2201/224; Y10T 292/71; Y10T 292/73
See application file for complete search history.

(56) References Cited

U.S. PATENT DOCUMENTS 485,613 A * 11/1892 Deane ................. E05D 11/1007 16/319
1,354,046 A * 9/1920 Lanning .................. E05C 17/54 292/343
1,939,402 A * 12/1933 Moser ..................... E05C 17/54 16/86 A
2,376,117 A * 5/1945 Bright ..................... E05C 17/54 D8/402
4,805,948 A 2/1989 Renzi
5,029,911 A 7/1991 Daniels
5,064,232 A 11/1991 Quarberg
5,217,269 A * 6/1993 Wiltberger ............. E05C 17/54 292/343
6,557,915 B1 5/2003 Duff
6,616,128 B2 * 9/2003 Selzer .................... A62B 3/005 52/712
7,014,229 B1 * 3/2006 Stelmach ................ E05C 17/54 292/342
7,976,080 B1 * 7/2011 Duff ........................ E05C 17/54 292/343
8,925,359 B2 1/2015 Frankel
9,085,923 B1 7/2015 McWhinney
9,605,456 B2 3/2017 Booker et al.
9,644,405 B2 5/2017 McCann et al.
10,113,350 B2 10/2018 Brown
10,413,805 B2 9/2019 James et al.
10,760,309 B1 * 9/2020 Bowman ................. E05C 17/54
D924,675 S * 7/2021 Potter ............................ D8/402
(Continued)

FOREIGN PATENT DOCUMENTS

CN 104989199 A * 10/2015
GB 2478366 A * 9/2011 ............. E05C 17/54
JP 2021017744 A * 2/2021

*Primary Examiner* — Chuck Y Mah
(74) *Attorney, Agent, or Firm* — Kinney & Lange, P.A.

(57) ABSTRACT

A doorstop includes a foot, a cleat mounted on the foot, a rope with a first end connected to the cleat and a primary loop formed from a second end of the rope. The rope can be wound around the cleat.

18 Claims, 17 Drawing Sheets

(56) References Cited

U.S. PATENT DOCUMENTS

| | | | | |
|---|---|---|---|---|
| 2004/0031806 | A1* | 2/2004 | Jackson | B65D 25/287<br>220/754 |
| 2010/0242226 | A1* | 9/2010 | Hopkins | E05C 17/54<br>16/82 |
| 2011/0254293 | A1* | 10/2011 | Duff | E05C 17/025<br>292/343 |
| 2014/0084605 | A1* | 3/2014 | Packer | E05C 17/54<br>292/343 |
| 2018/0142509 | A1* | 5/2018 | Brown | E05F 5/06 |
| 2020/0300009 | A1* | 9/2020 | Miller | E05C 17/025 |
| 2021/0189783 | A1* | 6/2021 | Siriwardana | E05F 5/04 |

* cited by examiner

DOORSTOP WITH A ROPE

CROSS-REFERENCE TO RELATED APPLICATION(S)

This application is related to U.S. application Ser. No. 17/896,556, filed on Aug. 26, 2022, entitled "MOUNTING BRACKET," the disclosure of which is incorporated by reference in its entirety. This application is related to U.S. application Ser. No. 17/896,566, filed on Aug. 26, 2022, entitled "DOORSTOP WITH REPLACEABLE PARTS," the disclosure of which is incorporated by reference in its entirety.

BACKGROUND

This application relates to doorstops and, more particularly, doorstops that can be retrieved without a user bending to retrieve the doorstop.

Doorstops are tools used to hold doors in an open position. There are various reasons doors need to be held in a certain position, like allowing for air circulation or when multiple people must pass through a doorway. Doors may also need to be held open when people passing through the doorway are maneuvering bulky items like cleaning supplies, moving boxes, or package deliveries. Doorstops also help in hospital settings like moving patients between rooms.

Typical doorstops are wedge shaped and made of rubber or wood. Doorstops are typically kicked under a door to correctly position and prop the door. Kicking a doorstop under a door can cause damage to the door. Alternatively, a user could bend over to position the doorstop. Certain professionals, like custodial workers and movers, may need to reposition a doorstop under multiple doors in one day. Such professionals would need to bend or stoop multiple times in a day to position and retrieve the doorstop, causing back strain and other injuries from repetitive motion.

SUMMARY

A doorstop includes a foot, a cleat mounted on the foot, a rope with a first end connected to the cleat and a primary loop formed from a second end of the rope. The rope can be wound around the cleat.

A doorstop includes a foot, a rope, a rope lock, and a cleat. A first end of the rope connects to the foot. The rope lock is mounted on the second end of the rope and forms a loop at the second end of the rope. The cleat is mounted on the foot and the rope can be wound around the cleat.

A doorstop includes a foot, a cleat, a rope, a rope lock, and a ring. The cleat is mounted on the foot. The rope has a first end threaded through the cleat and the foot. The rope lock is mounted on the rope and forms a primary loop at a second end of the rope. The ring is held adjacent to the foot by the first end of the rope.

DETAILED DESCRIPTION

Figure 1:
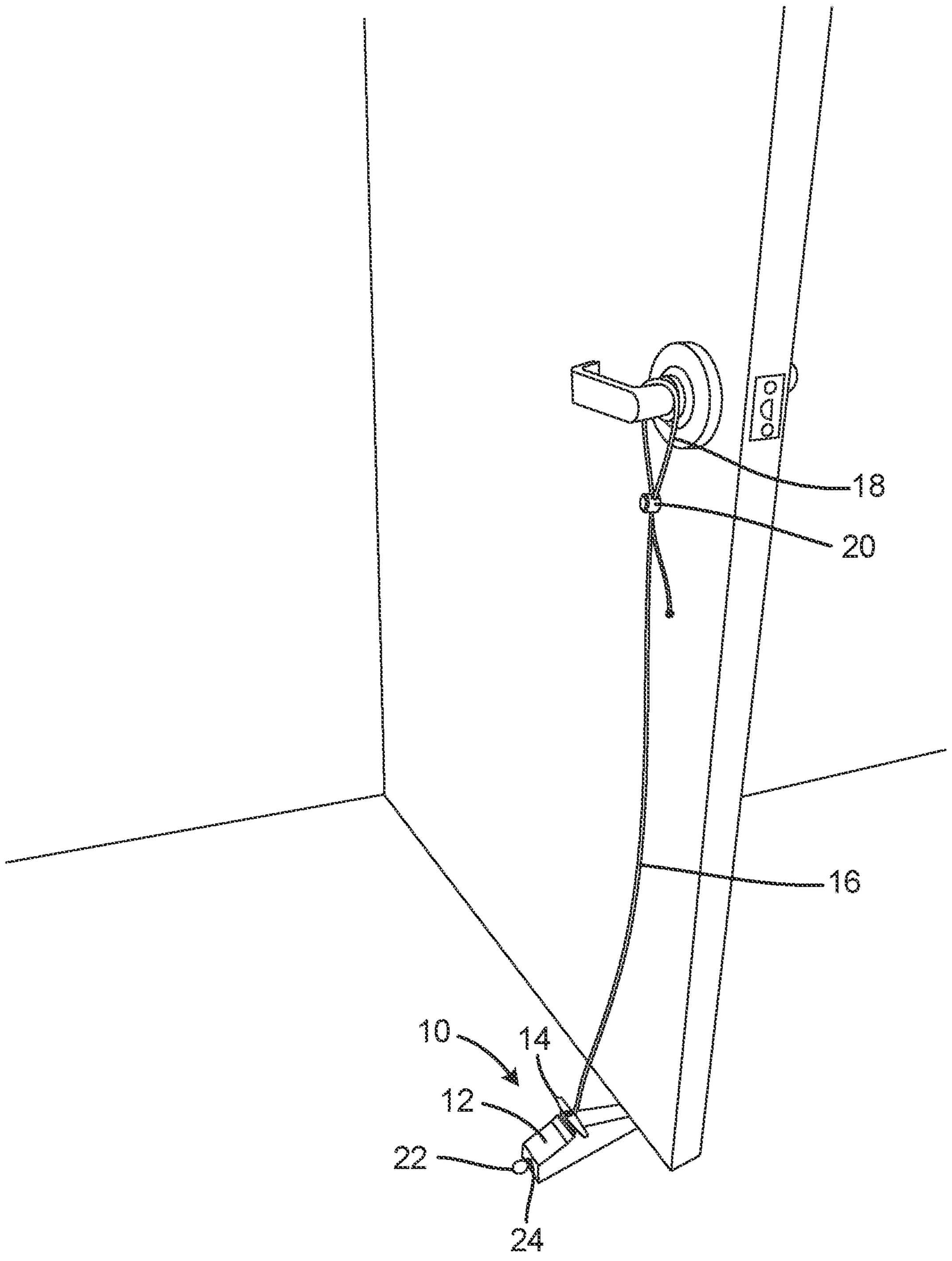
FIG. 1 is a perspective view of a door with a doorstop holding the door in place and a rope between the doorstop and a handle of the door.

FIG. 1 is a perspective view of a door with doorstop 10 holding the door in place and rope 16 between doorstop 10 and a doorhandle on the door. Doorstop 10 includes foot 12, cleat 14, rope 16, doorhandle loop 18, rope lock 20, ring 22, and ring loop 24.

Doorstop 10 has foot 12 with cleat 14 connected to a top of foot 12. Foot 12 is made of heavy rubber. A first end of rope 16 attaches to cleat 14 through a hole in cleat 14 and is secured with a knot in the first end of rope 16. Rope 16 is a braided nylon rope. Doorhandle loop 18 is a primary loop formed from a second end of rope 16. The second end of rope 16 threads through rope lock 20 twice to create doorhandle loop 18. Rope lock 20 is a spring-loaded lock that adjusts to vary the size of doorhandle loop 18. A knot in the second end of rope 16 secures rope lock 20 onto rope 16. Ring 22 connects to foot 12 by ring loop 24. Ring loop 24 can be formed from a short piece of rope. Ring loop 24 extends through a hole in foot 12 to hold ring 22 onto doorstop 10.

Doorstop 10 is designed to be positioned by a user on a floor under a lower edge of a door to hold the door in place. Rope 16 can lower foot 12 to the floor and guide foot 12 under the lower edge of the door. Foot 12 can be wedged under the door to hold the door in place. Rope 16 is long enough so doorhandle loop 18 can be placed around a doorhandle attached to the door while foot 12 is under the door but not so long that rope 16 will not fit onto cleat 14. Rope 16 is between 48 inches (122 centimeters) and 50 inches (127 centimeters) long. Rope lock 20 adjusts the size of doorhandle loop 18 to fit around the doorhandle and changes the placement of doorhandle loop 18 on rope 16 so that rope 16 is not slack between the doorhandle and foot 12.

When the door needs to be moved, a user can retrieve rope 16 from the doorhandle and pick up foot 12 using rope 16. Rope 16 wraps around cleat 14 for storage. Rope lock 20 can be readjusted to help hold rope 16 onto cleat 14 by placing doorhandle loop 18 around cleat 14 and tightening rope lock 20 until rope 16 is secure. Ring 22 allows for doorstop 10 to be carried hands-free by attaching ring 22 onto a key clip or other storage hook. Ring 22 can also be used to store doorstop 10 on a hook.

Doorstop 10 allows for positioning and retrieval by a user without the bending over, thereby preventing back injuries caused by repetitive bending and stooping. Placing doorhandle loop 18 over the doorhandle allows for storage of rope 16 out of the way while the door is open and makes retrieving rope 16 easier when it is time to reposition the door. Using rope lock 20 to position doorhandle loop 18 on rope 16 to reduce slack between the doorhandle and foot 12 limits the possibility rope 16 will catch on people or objects passing by the door. Rope 16 is a lightweight and flexible way to reposition and retrieve doorstop 10 that reduces the overall weight and bulk of doorstop 10. Cleat 14 provides a storage solution to reduce tangling rope 16 when not in use.

Figure 2:
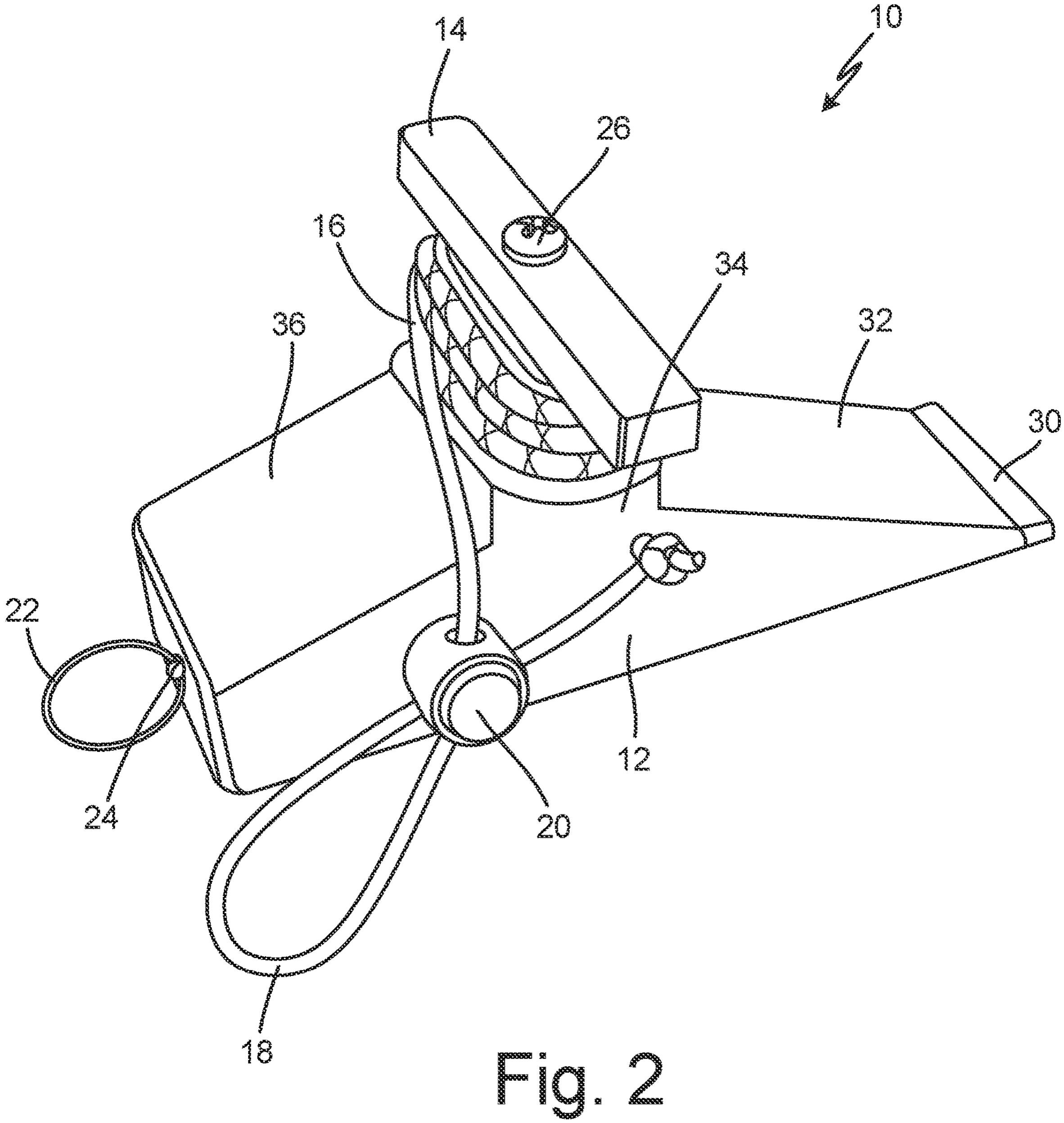
FIG. 2 is a perspective view of the doorstop with a cleat and the rope wrapped around the cleat.

FIG. 2 is a perspective view of doorstop 10 with cleat 14 and rope 16 wrapped around cleat 14. Doorstop 10 includes foot 12, cleat 14, rope 16, doorhandle loop 18, rope lock 20, ring 22, ring loop 24, screw, and nut 128 (not shown in FIG. 4B). Foot 12 includes lip portion 30, first sloped portion 32, pedestal portion 34, and second sloped portion 36.

Doorstop 10 in FIG. 2 has generally the same structure and function as doorstop 10 described with respect to FIG. 1, including foot 12, cleat 14, rope 16, doorhandle loop 18, rope lock 20, ring 22, and ring loop 24. However, FIG. 2 includes detail of screw 26 holding foot 12 and cleat 14 together and the shape of foot 12 including lip portion 30, first sloped portion 32, pedestal portion 34, and second sloped portion 36.

Screw 26 runs through cleat 14 and into foot 12. A head of screw 26 is positioned on a top of cleat 14. A tip of screw 26 extends into a recess portion of foot 12. Nut 28 threads onto the tip of screw 26 in the recess portion of foot 12. Nut 28 holds cleat 14 and foot 12 together on screw 26. A washer can also be placed onto screw 26 before nut 28 is threaded on, if necessary. Alternatively, screw 26 can hold cleat 14 into place without nut 128. In this alternative, the tip of screw 126 would be buried in foot 12.

Foot 12 has lip portion 30, first sloped portion 32, pedestal portion 34, and second sloped portion 36. Lip portion 30 is at a first end of foot 12. Lip portion 30 is a thin, flat portion of doorstop 10 and about one-eighth inch thick. First sloped portion 32 attaches to lip portion 30. Pedestal portion 34 attaches to first sloped portion 32 opposite where lip portion 30 is attached. Pedestal portion 34 is between first sloped portion 32 and second sloped portion 36. Pedestal portion 34 is elevated from first sloped portion 32 and second sloped portion 36. Cleat 14 is positioned on top of and screw 26 extends through pedestal portion 34. Second sloped portion 36 is at a second end of foot 12. Second sloped portion 36 is truncated compared to first sloped portion 32 and has a different angle of slope than first sloped portion 32. Ring 22 connects to foot 12 by ring loop 24, which extends through a hole in foot 12 near second sloped portion 36.

Screw 26 and nut 28 securely hold cleat 14 to foot 12. Lip portion 30 eases positioning foot 12 under a lower edge of a door when a gap between a floor the lower edge of the door is very small. This is the case when a door is on carpet, especially high-pile carpet. Either first sloped portion 32 or second sloped portion 36 may be positioned under a door, meaning doorstop 10 can be used with various doors having different spacing between the floor and a bottom edge of a door. FIG. 2 also shows how rope 16 can be wrapped around cleat 14 and doorhandle loop 18 is lassoed around one arm of cleat 14 to neatly store rope 16.

Figure 3:
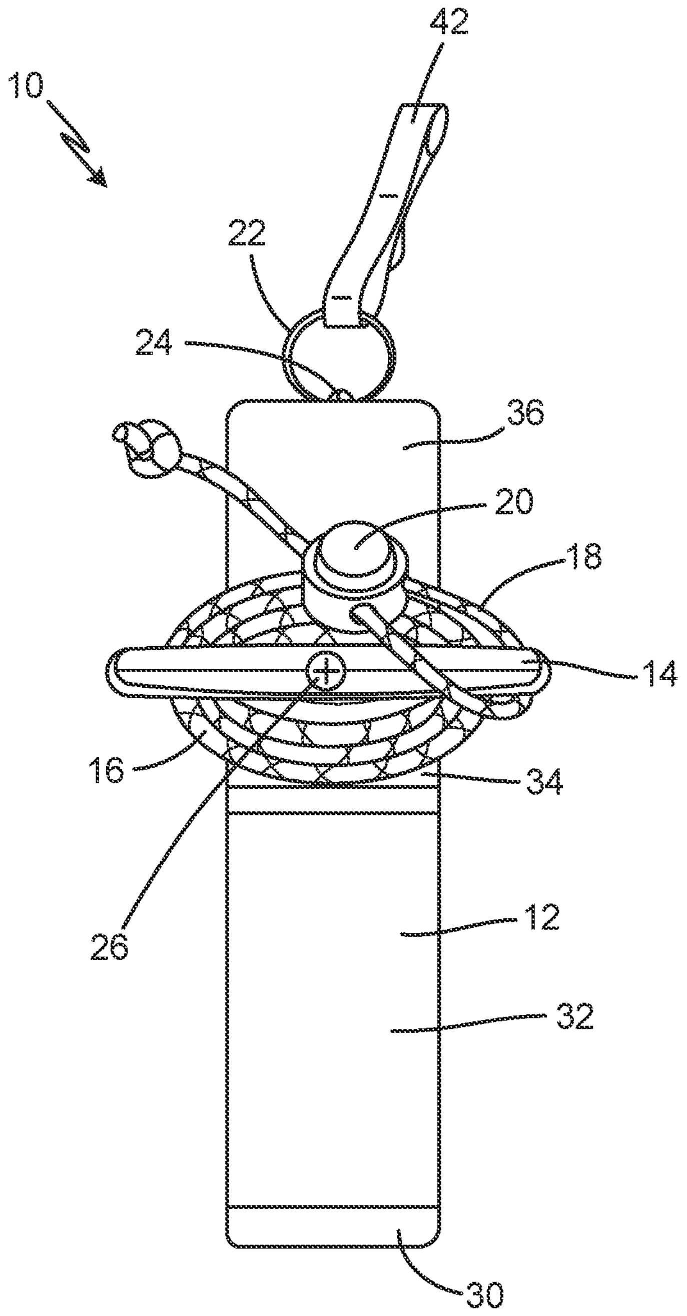
FIG. 3 is a perspective view of the doorstop attached to a belt key clip.

FIG. 3 is a perspective view of doorstop 10 attached to belt key clip 42. FIG. 3 shows doorstop 10 including foot 12, cleat 14, rope 16, doorhandle loop 18, rope lock 20, ring 22, and ring loop 24. Foot 12 includes lip portion 30, first sloped portion 32, pedestal portion 34, and second sloped portion 36. FIG. 3 also shows belt key clip 42.

Doorstop 10 in FIG. 3 has generally the same structure and function described with respect to FIGS. 1-2, including foot 12 with lip portion 30, first sloped portion 32, pedestal portion 34, and second sloped portion 36, cleat 14, rope 16, doorhandle loop 18, rope lock 20, ring 22, and ring loop 24. However, ring 22 is connected to belt key clip 42.

FIG. 3 shows how doorstop 10 can be carried on belt key clip 42. Ring loop 26 extends through a hole in foot 12 near second sloped portion 36. Ring loop 24 holds ring 22 onto foot 12. Ring 22 can be removably attached to belt key clip 42 by sliding over one open end of belt key clip 42. Belt key clip 42 is shown as a tri-fold metal strip, however belt key clip 42 could also be a carabiner clip or other appropriate type of clip. Belt key clip 42 allows doorstop 10 to be carried on a belt hands-free. Belt key clip keeps doorstop 10 easily at hand when having to use it multiple times in a row on different doors in different locations.

Figure 4A:
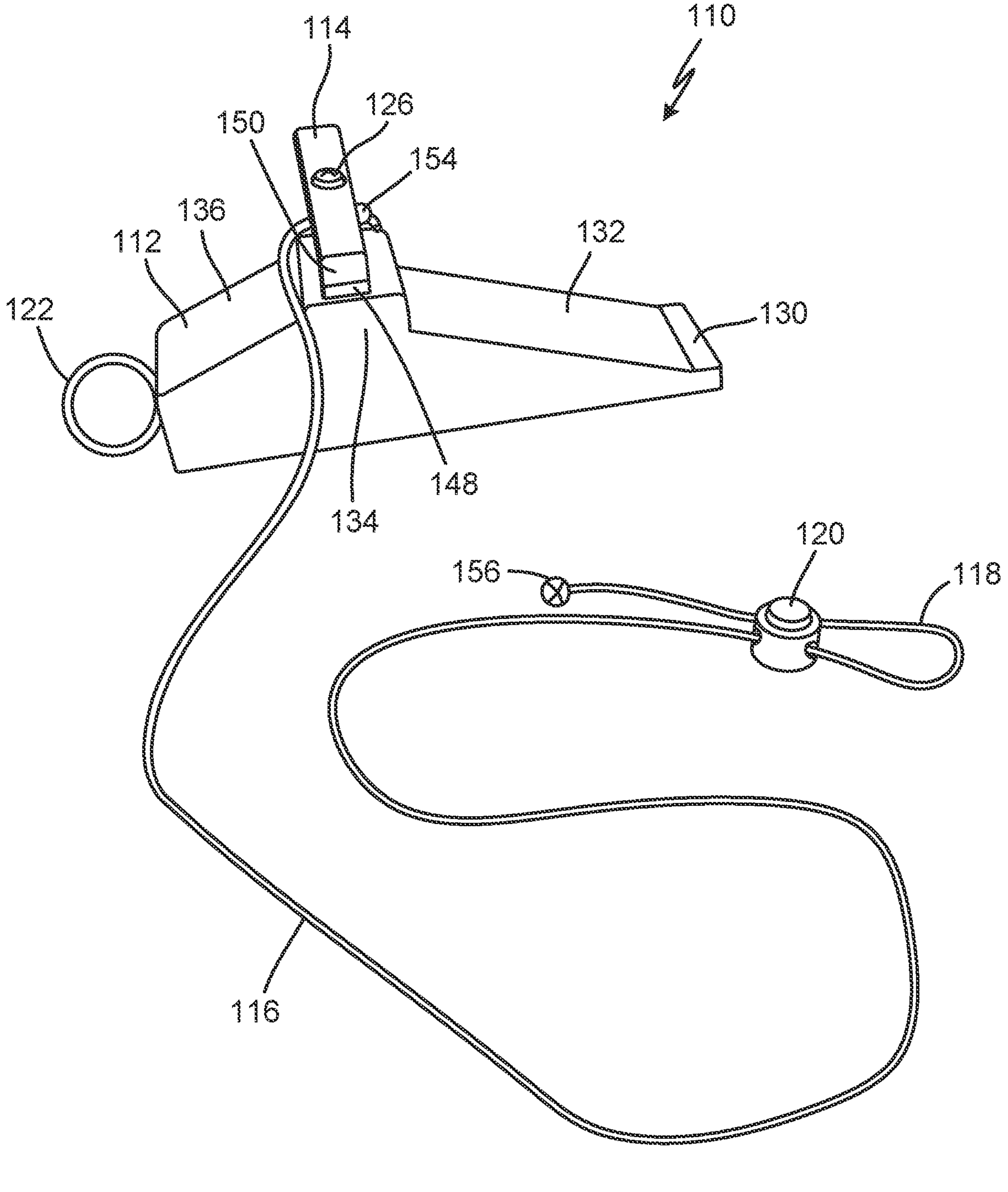
FIG. 4A is a perspective view of a first embodiment of a doorstop.
Figure 4B:
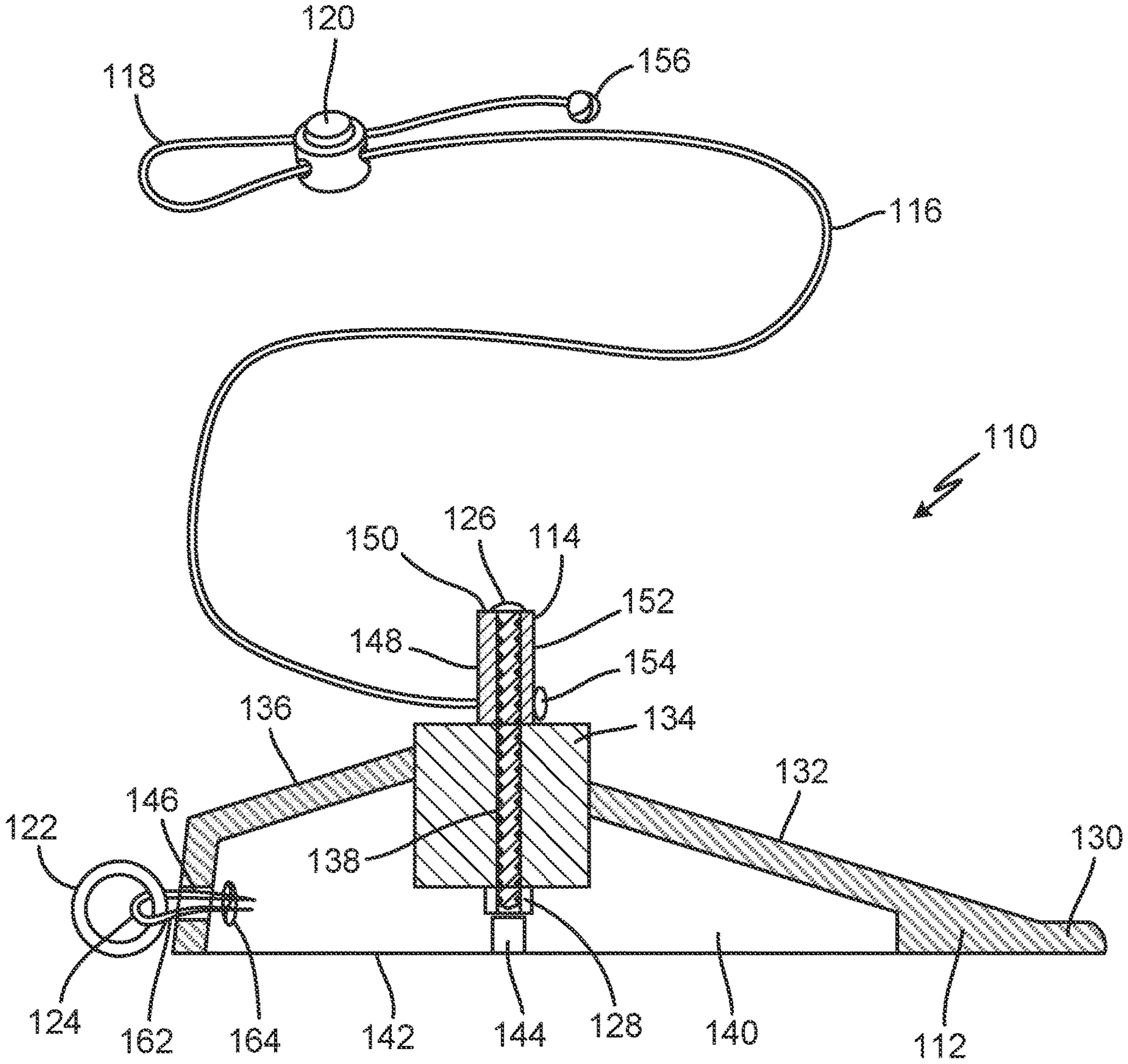
FIG. 4B is a side cross-sectional view of the first embodiment of the doorstop.

FIG. 4A is a perspective view of doorstop 110. FIG. 4B is a side cross-sectional view of doorstop 110. FIGS. 4A-4B will be discussed together. Doorstop 110 includes foot 112, cleat 114, rope 116, doorhandle loop 118, rope lock 120, ring 122, ring loop 124, screw 126, and nut 128 (shown in FIG. 4B). Foot 112 includes lip portion 130, first sloped portion 132, pedestal portion 134, and second sloped portion 136. Foot 112 also includes bore 138 (shown in FIG. 4B), recess area 140 (shown in FIG. 4B), opening 142 (shown in FIG. 4B), pockets 144 (shown in FIG. 4B), and hole 146 (shown in FIG. 4B). Cleat 114 includes standoff 148, crossbar 150, and bore 152 (shown in FIG. 4B). Rope 116 includes first knot 154, and second knot 156. Ring loop 124 includes ring rope 162 (shown in FIG. 4B) and ring knot 164.

Doorstop 110 has generally the same structure and function as doorstop 10 shown in FIGS. 1-3, including foot 112 with lip portion 130, first sloped portion 132, pedestal portion 134, and second sloped portion 136, cleat 114, rope 116, doorhandle loop 118, rope lock 120, ring 122, and ring loop 124. However, FIG. 4B shows bore 138, recess area 140, opening 142, pockets 144, and hole 146 in foot 112. FIG. 4B also shows detail of cleat 114 (including standoff 148, crossbar 150, and bore 152), rope 116 (including first knot 154 and second knot 156), and ring loop (including ring rope 162, and ring knot 164).

Bore 138 is through pedestal portion 134 into recess area 140 within foot 112. Recess area 140 is under first sloped portion 132, pedestal portion 134, and second sloped portion 136. Opening 142 is in a bottom surface of foot 112 around recess area 140. Pockets are in opposite sides of recess area 140 and extend to the bottom surface of foot 112. Pockets 144 are aligned with one another and under pedestal portion 134. Pockets 144 are generally rectangular and have a depth between 0.55 centimeters and 0.65 centimeters. Preferably, pockets are 0.6 centimeters deep, measured from the bottom surface of foot 112 to ends of pockets 144 within recess area 140. Hole 146 is through the second end of foot 112 near second sloped portion 136. Hole 146 extends into recess area 140.

Cleat 114 includes standoff 148, crossbar 150, and bore 152. Standoff 148 has a first side adjacent to a top of foot 112 at pedestal portion 134. Crossbar 150 extends perpendicularly across a second side of standoff 148. Bore 152 runs through crossbar 150 and standoff 148. Bore 152 of cleat 114 aligns with bore 138 of foot 112. Screw 126 extends through bore 152 and bore 138 into recess area 140. Nut 128 is threaded onto an end screw 126 to hold cleat 114 and foot 112 together. Nut 128 is in recess area 140.

Rope 116 includes first knot 154 in a first end and second knot 156 in a second end. The first end of rope 116 threads through a hole in standoff 148 of cleat and first knot 154 secures rope 116 onto cleat 114. First knot 154 is an overhand knot larger than the hole in standoff 148. The first end of rope 116 could alternatively connect to foot 112 at, for example, pedestal portion 134. For example, there could be a hole through pedestal portion and first knot 154 can be tied in the first end of rope 116 after threading through the hole in pedestal portion 134. A tip of the first end of rope 116 is welded by heating it where rope 116 was cut and pressing the heated nylon fibers together to keep rope 116 from fraying. The tip can also be welded to first knot 154 by heating the tip and a side of the first knot 154, then pressing the tip and the first knot together, decreasing the possibility first knot 154 will come untied.

The second end of rope 116 threads through rope lock 120 to create doorhandle loop 118. Second knot 156 is then tied in the second end of rope 116 to keep rope lock 120 on rope 116. Second knot 156 is an overhand knot. A tip of the second end of rope 116 can be welded by itself or with second knot 156, as described with first knot 154.

Ring 122 is held to the rear end of foot 112 by ring loop 124. Ring rope 162 is tied in a loop shape by ring knot 164, forming ring loop 124. Ring knot can be a welded knot like first knot 154 or second knot 156. Ring knot 164 is slightly larger than hole 146 in foot 112. Ring loop 124 threads through hole 146 and ring 122 attaches to loop 124. Ring rope 162 is held in place in hole 146 by ring 122 on an outside of foot 112 and ring knot 156 in recess area 140.

Doorstop 110 is designed to be used without a user having to bend over to retrieve it. Doorstop 110 holds a door in place like doorstop 10, as described in relation to FIGS. 1-3. Doorstop 110 has similar benefits as those described in relation to doorstop 10. Rope 116 allows for doorstop 10 to be positioned and retrieved without bending over, saving the user from repeated bending and injuries that are associated with repetitive motion. Doorhandle loop 118 is adjustable to accommodate varying doorhandle shapes and sizes and to limit the amount of slack rope 116 has when doorstop 110 is propping a door open, limiting the possibility of rope 116 tangling with people or objects passing through the door. Cleat 114 is a compact storage solution for rope 116 when doorstop 110 is not propping a door open, thereby reducing the chance of tangling. Cleat 114 also allows for secure storage by placing doorhandle loop 118 around one arm of crossbar 150. Ring 122 allows doorstop 110 to be carried hands-free on a belt key clip.

Doorstop 110 also has the added benefit of easy assembly. Doorstop 110 has screw 126 that runs through both foot 112 and cleat 114 and secures both portions with nut 128. Utilizing screw 126 and nut 128 reduces the number of pieces and equipment for assembly, reducing the time and cost of assembling doorstop 110. Ring rope 162 is also a lightweight and simple solution to create ring loop 124. Recess area 140 reduces the overall weight of doorstop 110.

Figure 5A:
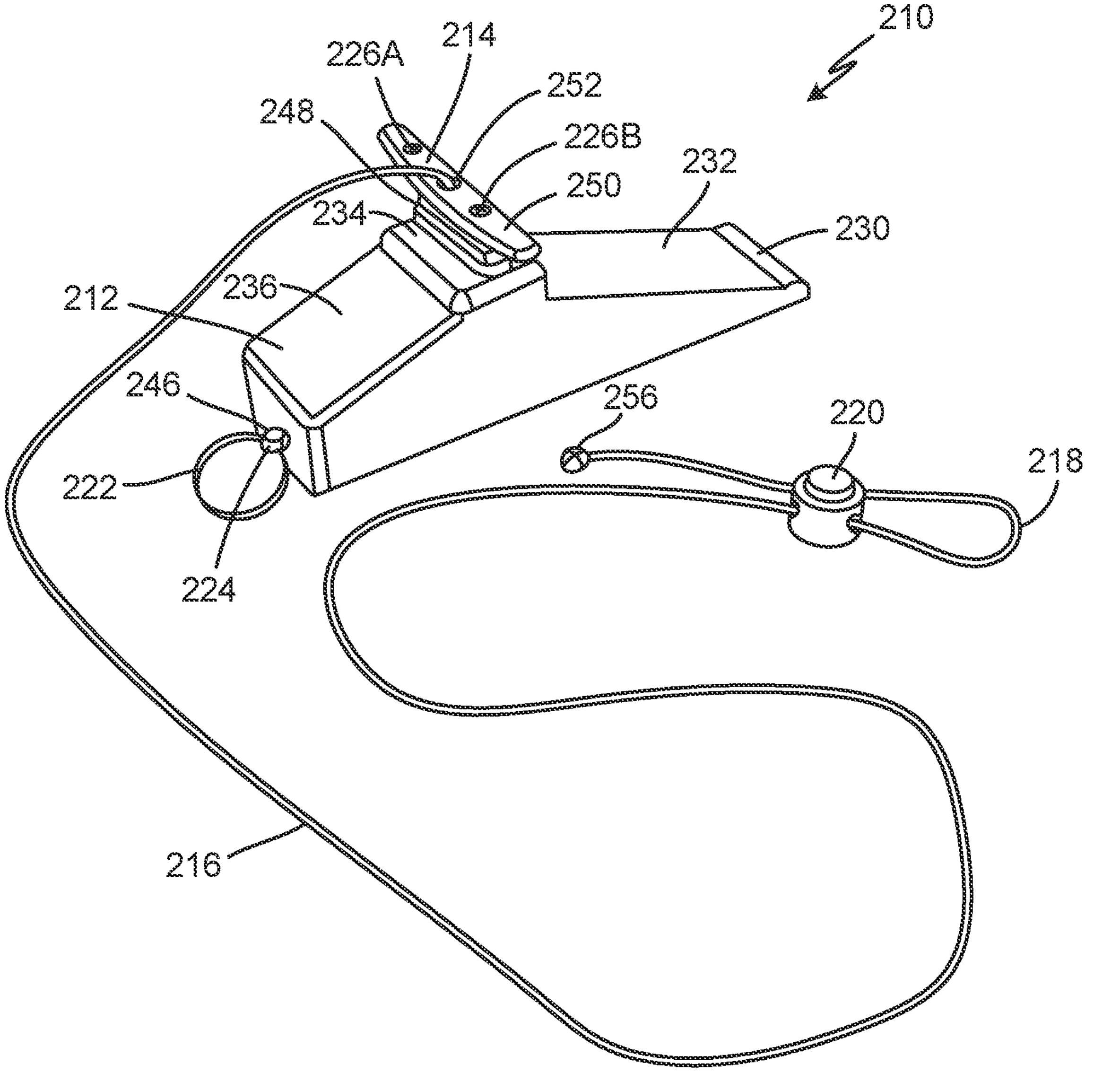
FIG. 5A is a perspective view of a second embodiment of a doorstop.
Figure 5B:
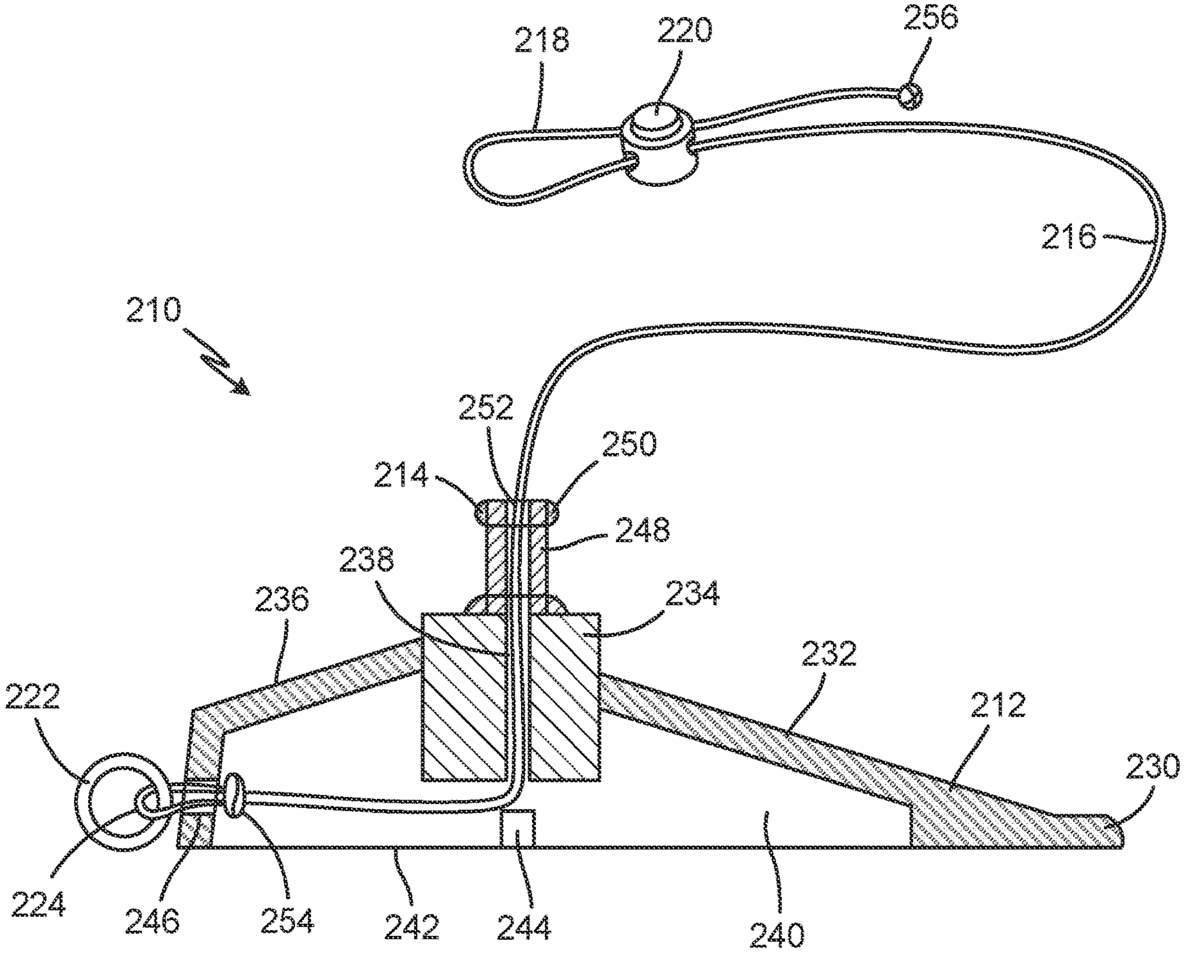
FIG. 5B is a side cross-sectional view of the second embodiment of the doorstop.

FIG. 5A is a perspective view of doorstop 210. FIG. 5B is a side cross-sectional view of doorstop 210. Doorstop 210 includes foot 212, cleat 214, rope 216, doorhandle loop 218, rope lock 220, ring 222, ring loop 224, screw 226A (shown in FIG. 5A), and screw 226B (shown in FIG. 5A). Foot 212 includes lip portion 230, first sloped portion 232, pedestal portion 234, and second sloped portion 236. Foot 212 also includes bore 238 (shown in FIG. 2B), recess area 240 (shown in FIG. 2B), opening 242 (shown in FIG. 2B), pockets 244 (shown in FIG. 2B), and hole 246. Cleat 214 includes standoff 248, crossbar 250, and bore 252. Rope 216 includes first knot 254 and second knot 256.

Doorstop 210 has generally the same structure and function as doorstop 10 described with respect to FIGS. 1-3, including foot 212 with, cleat 214, rope 216, doorhandle loop 218, rope lock 220, ring 222, ring loop 224, lip portion 230, first sloped portion 232, pedestal portion 234, and second sloped portion 236. However, doorstop 210 has a different construction regarding foot 212 (including bore 238, recess area 240, opening 242, pockets 244 and hole 246), cleat 214 (including standoff 248, crossbar 250, and bore 252), and rope 216 (including first knot 254 and second knot 256).

Foot 212 includes bore 238, recess area 240, opening 242, pockets 244, and hole 246. Bore 238 is through pedestal portion 234 into recess area 240. Recess area 240 is a hollow area under first sloped portion 232, pedestal portion 234, and second sloped portion 236. Opening 242 is in a bottom surface of foot 212 around recess area 240. Pockets are in opposite sides of recess area 240 and extend to the bottom surface of foot 212. Pockets 244 are aligned with one another and under pedestal portion 234. Pockets 244 are generally rectangular and have a depth between 0.55 centimeters and 0.65 centimeters. Preferably, pockets are 0.6 centimeters deep, measured from the bottom surface of foot 212 to ends of pockets 244 within recess area 140. Hole 246 is in a rear side of foot near second sloped portion 236.

Cleat 214 includes standoff 248, crossbar 250, and bore 252. Standoff 248 has a base attached to foot 212 at a top of pedestal portion 234. Two vertical pillars extend from the base of standoff 248. Crossbar 250 connects the pillars at a top of standoff 248. Bore 252 is through a center of crossbar 250 and the base of standoff 248. Cleat 214 is held onto foot 212 by screw 226A and screw 226B. Screw 226A and screw 226B are each positioned in one of the pillars of standoff 248 and extend through cleat 214 into foot 212. Screw 226A and screw 226B each have a screw head that is on crossbar 250 and a tip buried in pedestal portion 234 of foot 212.

Rope 216 includes first knot 254 and second knot 256. First knot 254 is in a first end of rope 216. The first end of rope 216 threads through bore 252 and bore 238 into recess area 240 of foot 12. First knot 254 is tied into the first end of rope 216 to create ring loop 224. Ring loop 224 is pushed through hole 246 and ring 222 is threaded onto ring loop 224. First knot 254 is slightly larger than hole 246 to prevent a large amount of rope 216 from being pulled out of recess area 240. Second knot 256 is tied into a second end of rope 216 to keep rope lock 220 from falling off. First knot 254 and second knot 256 can be welded, like first knot 154 and second knot 156 as discussed in relation to FIGS. 4A-4B.

Doorstop 210 functions similarly to doorstop 10, as described in relation to FIGS. 1-3. Doorstop 210 allows for positioning and retrieval by a user without the bending over, thereby preventing back injuries caused by repetitive bending and stooping. Doorstop 210 has only rope 216 which forms both doorhandle loop 218 and ring loop 224, which eases assembly and reduces the number of parts. Doorstop 210 has screw 226A and screw 226B that are through cleat 214 into foot 212 to hold doorstop 210 together. Tips of screw 226A and screw 226B are encased in foot 212 and do not require a nut, also easing assembly. Fewer parts reduce the complexity of assembling doorstop 210 and therefore the overall cost.

Figure 6A:
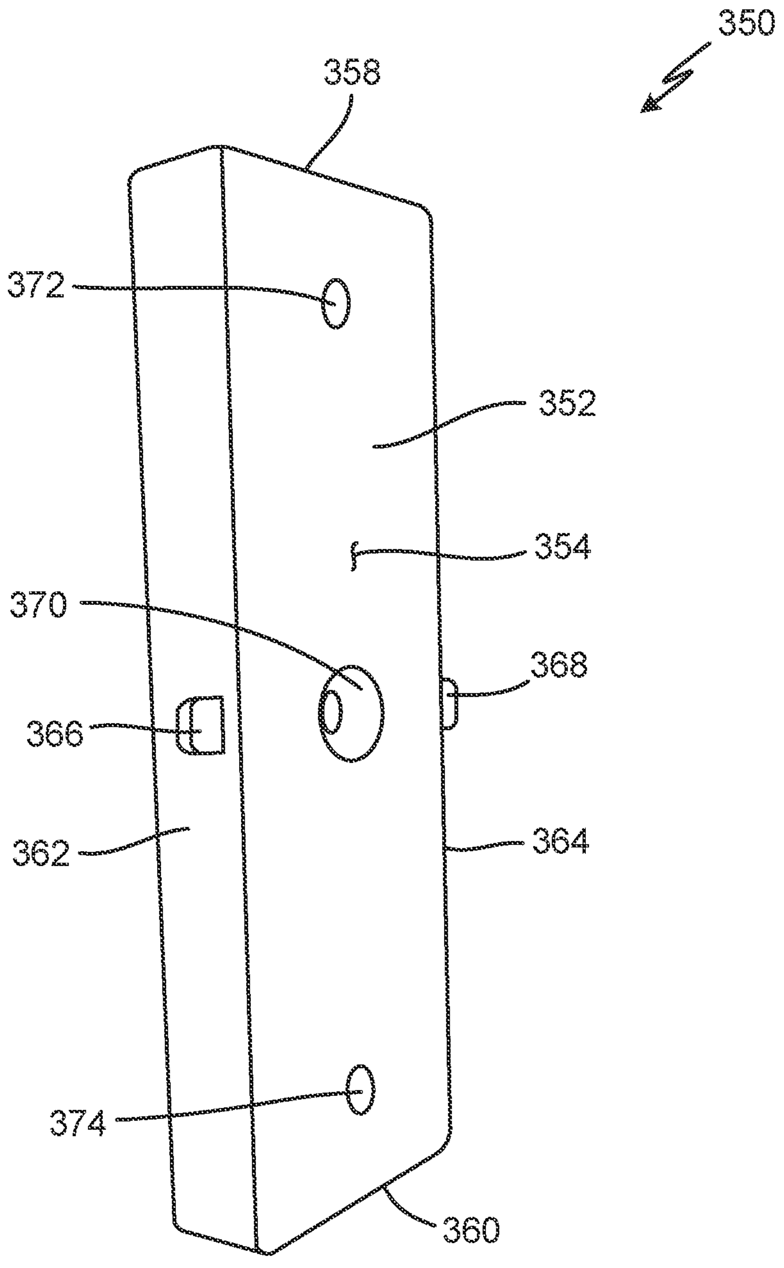
FIG. 6A is a front perspective view of a doorstop mounting bracket.
Figure 6B:
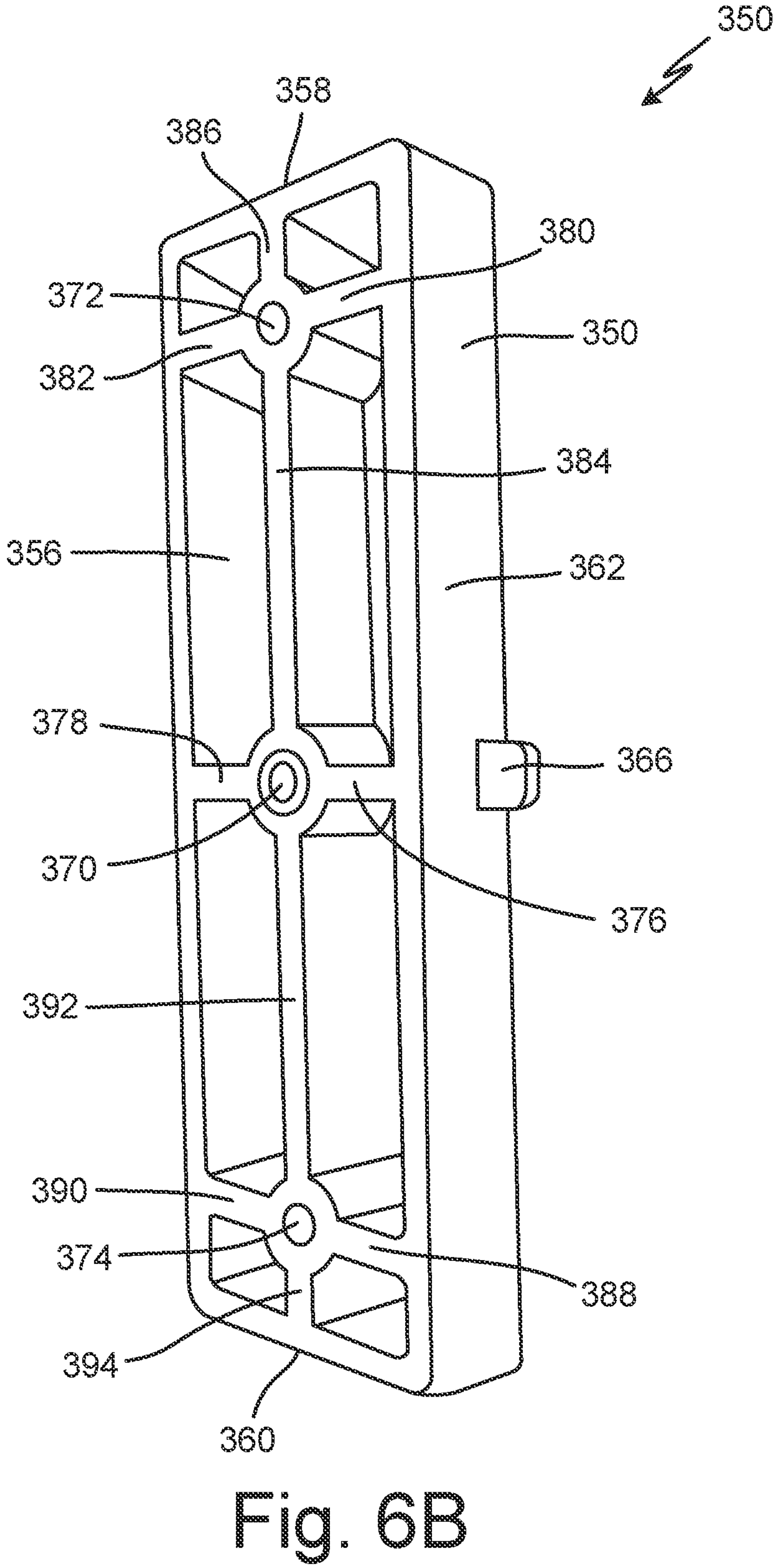
FIG. 6B is a rear perspective view of the doorstop mounting bracket.

FIG. 6A is a front perspective view of doorstop mounting bracket 350. FIG. 6B is a rear perspective view of bracket 350. Bracket 350 includes body 352 with front 354 (shown in FIG. 6A), back 356 (shown in FIG. 6B), top 358, bottom 360, first side 362, second side 364. Bracket 350 also includes first protrusion 366 (shown in FIG. 6A), second protrusion 368, primary hole 370, first alternate hole 372, and second alternate hole 374. FIG. 6B shows back 354 of bracket 350 including rib 376, rib 378, rib 380, rib 382, rib 384, rib 386, rib 388, rib 390, rib 392, and rib 394.

Bracket 350 can be made from heavy plastic using typical manufacturing processes, like injection molding. Bracket 350 has a generally cuboid body 352. Body 352 has front 354 across from back 356. Front 354 and back 356 are opposite rectangular faces of body 352. The rectangular faces of front 354 and back 356 each have two shorter dimensions across from one another and two longer dimensions across from one another. Top 358 and bottom 360 connect the shorter dimensions of the rectangular faces that make up front 354 and back 356. First side 362 and second side 364 connect the longer dimensions of the rectangular faces that make up front 354 and back 356.

Cuboid body 352 has a height between top 358 and bottom 360. The height is between 10.5 centimeters and 11.0 centimeters. The height is preferably 10.8 centimeters. Body 352 has a length between first side 362 and second side 364. The length is between 3.25 centimeters and 3.35 centimeters. The height is preferably 3.3 centimeters. Body 352 has a width between front 354 and back 356. The width is between 1.25 centimeters and 1.35 centimeters and is preferably 1.3 centimeters. Cuboid body 352 is sized to fit tightly within a recess area in a doorstop, like recess area 140 in doorstop 110 (shown in FIG. 4B) and recess area 240 in doorstop 210 (shown in FIG. 5B).

First protrusion 366 extends from first side 362 and second protrusion 368 extends from second side 364. First protrusion 366 and second protrusion 368 are spaced equally from top 358 and bottom 360. A top of first protrusion 366 and a top of second protrusion 368 are both spaced 5.1 centimeters from top 358. A bottom of first protrusion 366 and a bottom of second protrusion 368 are spaced 5.1 centimeters from bottom 360. First protrusion 366 and second protrusion 368 are offset from front 354 such that a front of first protrusion 366 and a front of second protrusion 368 are between 0.1 centimeters and 0.2 centimeters away from front 354. Preferably, the front of first protrusion and the front of second protrusion are 0.15 centimeters away from front 354 of body 352. First protrusion 366 and second protrusion 368 are sized and positioned to fit into pockets in a doorstop, like pockets 144 in doorstop 110 (shown in FIG. 4B) and pockets 244 in doorstop 210 (shown in FIG. 5B).

Bracket 350 also includes primary hole 370, first alternate hole 372, and second alternate hole 374. Primary hole 370 is through cuboid body 352, from front 354 to back 356, and is near a center of body 352. Primary hole 370 is a countersunk hole with a bevel near front 354. First alternate hole 372 and second alternate hole 374 are smaller holes that extend through body 352, from front 354 to back 356. First alternate hole 372 and second alternate hole 374 are flush with front 354. First alternate hole is near top 358. Second alternate hole is near bottom 360.

Back 356 of bracket 350 is partially recessed. Back 356 includes rib 376, rib 378, rib 380, rib 382, rib 384, rib 386, rib 388, rib 390, rib 392, and rib 394. Ribs 376-394 are stiffeners and provide structural support for bracket 350. Bracket 350 includes latitudinal stiffeners (which are generally parallel to top 358 and bottom 360) and longitudinal stiffeners (which are generally parallel to first side 362 and second side 364). Rib 376 is a latitudinal stiffener between primary hole 370 and first side 362 of body 352. Rib 378 is a latitudinal stiffener between primary hole 370 and second side 364. Rib 380 is a latitudinal stiffener between first alternate hole 372 and first side 362 of body 352. Rib 382 is a latitudinal stiffener between first alternate hole 372 and second side 364. Rib 384 is a longitudinal stiffener between primary hole 370 and first alternate hole 372. Rib 386 is a longitudinal stiffener between first alternate hole 372 and top 358 of body 352. Rib 388 is a latitudinal stiffener between second alternate hole 374 and first side 362 of body 352. Rib 390 is a latitudinal stiffener between second alternate hole 374 and second side 364 of body 352. Rib 392 is a longitudinal stiffener between first alternate hole 374 and primary hole 370. Rib 394 is a longitudinal stiffener between second alternate hole 374 and bottom 360 of body 352.

Primary hole 370, first alternate hole 372, and second alternate hole 374 extend through body 352 aligned with longitudinal stiffeners (rib 384, rib 386, rib 392, and rib 394). Latitudinal stiffeners (rib 376, rib 378, rib 380, rib 382, rib 388, and rib 390) cross the longitudinal stiffeners where primary hole 370, first alternate hole 372, and second alternate hole 374 are located along the longitudinal stiffeners. Crossing the longitudinal stiffeners and the latitudinal stiffeners creates a support grid in body 352 of bracket 350. Crossing the longitudinal stiffeners and the latitudinal stiffeners at primary hole 370, first alternate hole 372, and second alternate hole 374 reinforces bracket 350 where the holes have weakened it.

Bracket 350 mounts to a vertical surface to store a doorstop with a recess area and pockets in the recess area sidewalls, like doorstop 10 (shown in FIGS. 1-3), doorstop 110 (shown in FIGS. 4A-4B), and doorstop 210 (shown in FIGS. 5A-5B). Bracket 350 is made of a sturdy material, like plastic, and can be made through injection molding. Bracket 350 mounts to the vertical surface with fasteners, like screws or nails, through primary hole 370, first alternate hole 372, and/or second alternate hole 374. First protrusion 366 and second protrusion 368 mate with pockets in the doorstop to help properly align the doorstop on bracket 350 and hold the doorstop slightly away from the vertical surface. Bracket 350 is mounted to the vertical surface such that back 364 is against the vertical surface and front 362 faces out.

Bracket 350 is an inexpensive and simple way to mount a doorstop on a vertical surface. Bracket 350 is lightweight and easy to use mount. Primary hole 370, first alternate hole 372, and second alternate hole 374 allow for flexibility in mounting depending on the type of vertical surface bracket 350 is being mounted onto and the requisite fastener for mounting. Once mounted, bracket 350 is small and thin, so it is unobtrusive. Designing back 364 as partially recessed reduces the weight and amount of material (and consequently production cost) necessary for bracket 350. Ribs 376-394 are stiffeners that strengthen bracket 350. Crossing the stiffeners creates a stiffening grid in bracket 350 that provides mechanical support for primary hole 370, first alternate hole 372, and second alternate hole 374.

Figure 7:
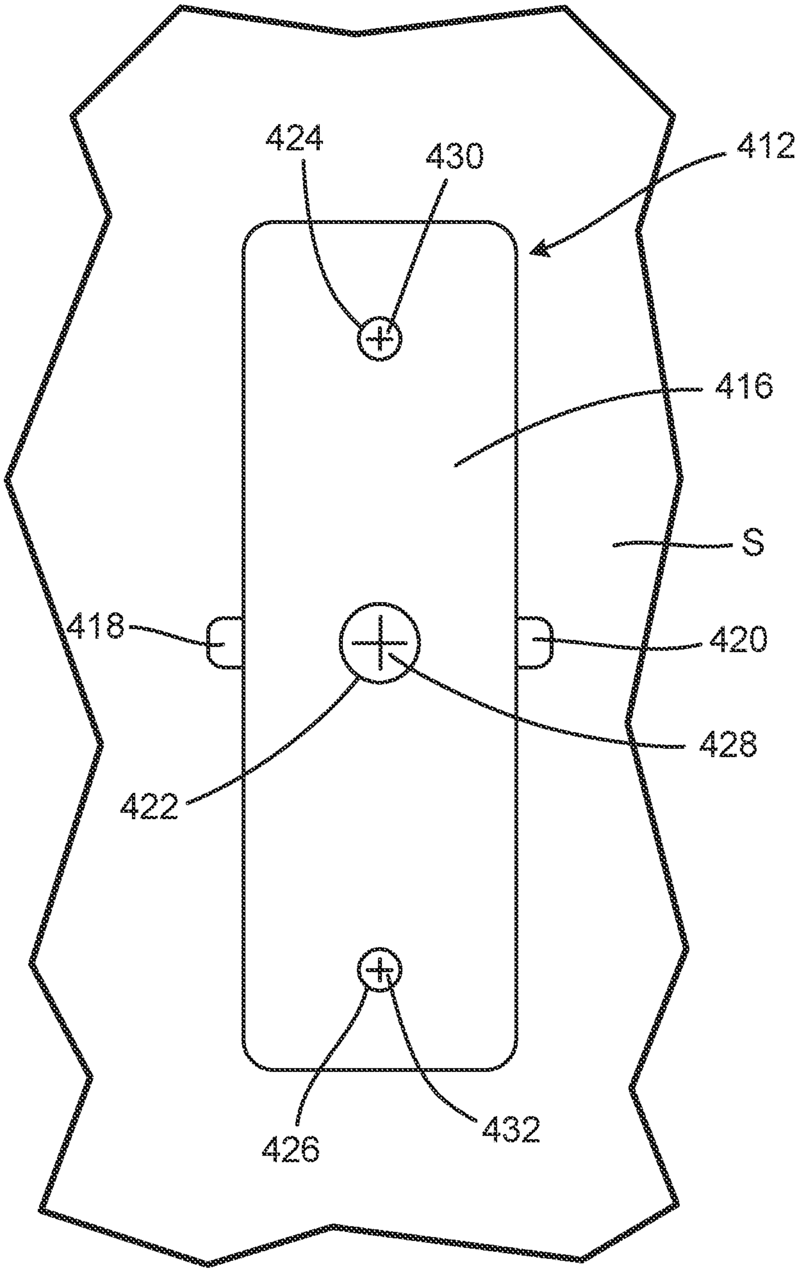
FIG. 7 is a front view of a doorstop mounting bracket mounted on a vertical surface.

FIG. 7 is a front view of doorstop mounting bracket 412 on vertical surface S. Bracket 412 includes body 416, first protrusion 418, second protrusion 420, primary hole 422, first alternate hole 424, and second alternate hole 426. FIG. 7 also shows first fastener 428, second fastener 430, and third fastener 432.

Doorstop mounting bracket 412 has generally the same structure and function as backet 350 described with respect to FIGS. 6A-6B, including body 416, first protrusion 418, second protrusion 420, primary hole 422, first alternate hole 424, and second alternate hole 426. However, bracket 412 is mounted to vertical surface S using first fastener 428, second fastener 430, and third fastener 432.

First fastener 428 is in primary hole 422 and extends through body 414 into vertical surface S. Second fastener 430 and third fastener 432 are in first alternate hole 424 and second alternate hole 426, respectively, and extend through body 416 into vertical surface S. First fastener 428, second fastener 430, and third fastener 432 could be any appropriate fastener used to securely hold bracket 412 to vertical surface S. First fastener 428, second fastener 430, and third fastener 432 could be the same type of fastener or different types of fasteners. Such fasteners include nails with or without wall anchors and screws with or without wall anchors. Which fastener type used depends on the characteristics of vertical surface S. For example, if vertical surface S is solid, like a solid core door or a portion of wall over a stud, then a screw or nail would be a proper fastener. In another example, if vertical surface S is hollow, like a hollow core door or a portion of drywall without a stud behind it, then a screw with a wall anchor would be a proper anchor.

In FIG. 7, bracket 412 is held against vertical surface S with first fastener 428 in primary hole 422, second fastener 430 in first alternate hole 424, and third fastener 432 in second alternate hole 426. However, bracket 412 could be held with different fastener configurations. For example, bracket 412 could be held to vertical surface S by second fastener 430 in first alternate hole 424 and third fastener 432 in second alternate hole 426 alone. In another example, bracket 412 could be held against vertical surface S with only first fastener 428 in primary hole 422, only second fastener 430 in first alternate hole 424, or only third fastener 432 in second alternate hole 426.

Bracket 412 allows a doorstop with a recess area (like doorstop 10 in FIGS. 1-3, doorstop 110 in FIGS. 4A-4B, or doorstop 210 in FIGS. 5A-5B) to be mounted and stored on vertical surface S. Bracket 412 is a lightweight and slim bracket for holding the doorstop that is unobtrusive when the doorstop is in use. Body 416 is designed to fit tightly into the recess area of the doorstop to hold the doorstop onto bracket 412. First protrusion 418 and second protrusion 420 help align the doorstop onto bracket 412, create a gap between a bottom of the doorstop and vertical surface, and keep the doorstop from slipping down along body 416. The gap eases removal of the doorstop from bracket 412. Storing a doorstop on bracket 412 keeps an unused doorstop off the floor, reducing the chance of tripping on it.

Figure 8A:
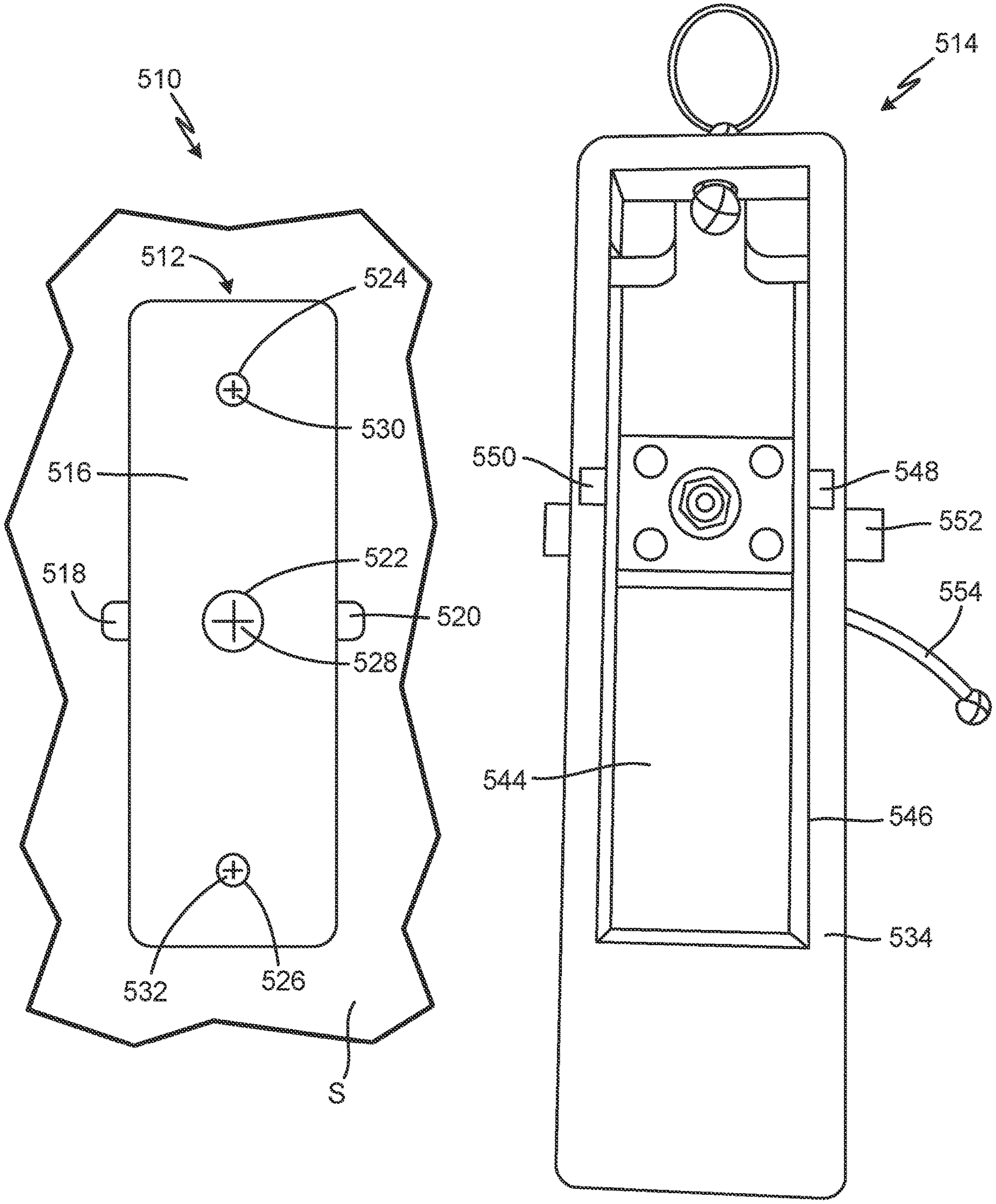
FIG. 8A is a perspective view of a doorstop storage system including a bracket mounted on a vertical surface and a doorstop that can be stored on the bracket.
Figure 8B:
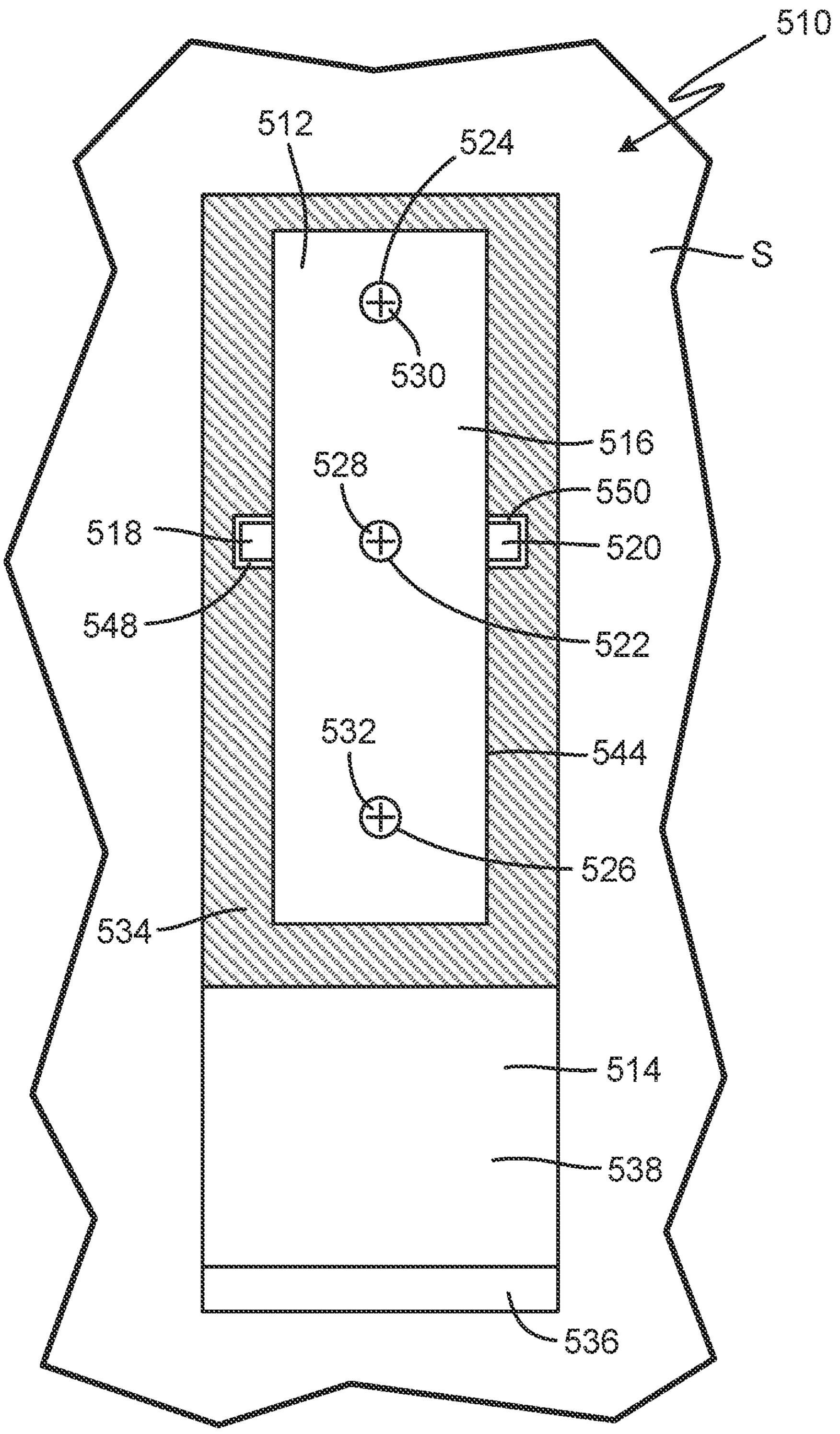
FIG. 8B is a front cross-sectional view of the doorstop on the bracket.
Figure 8C:
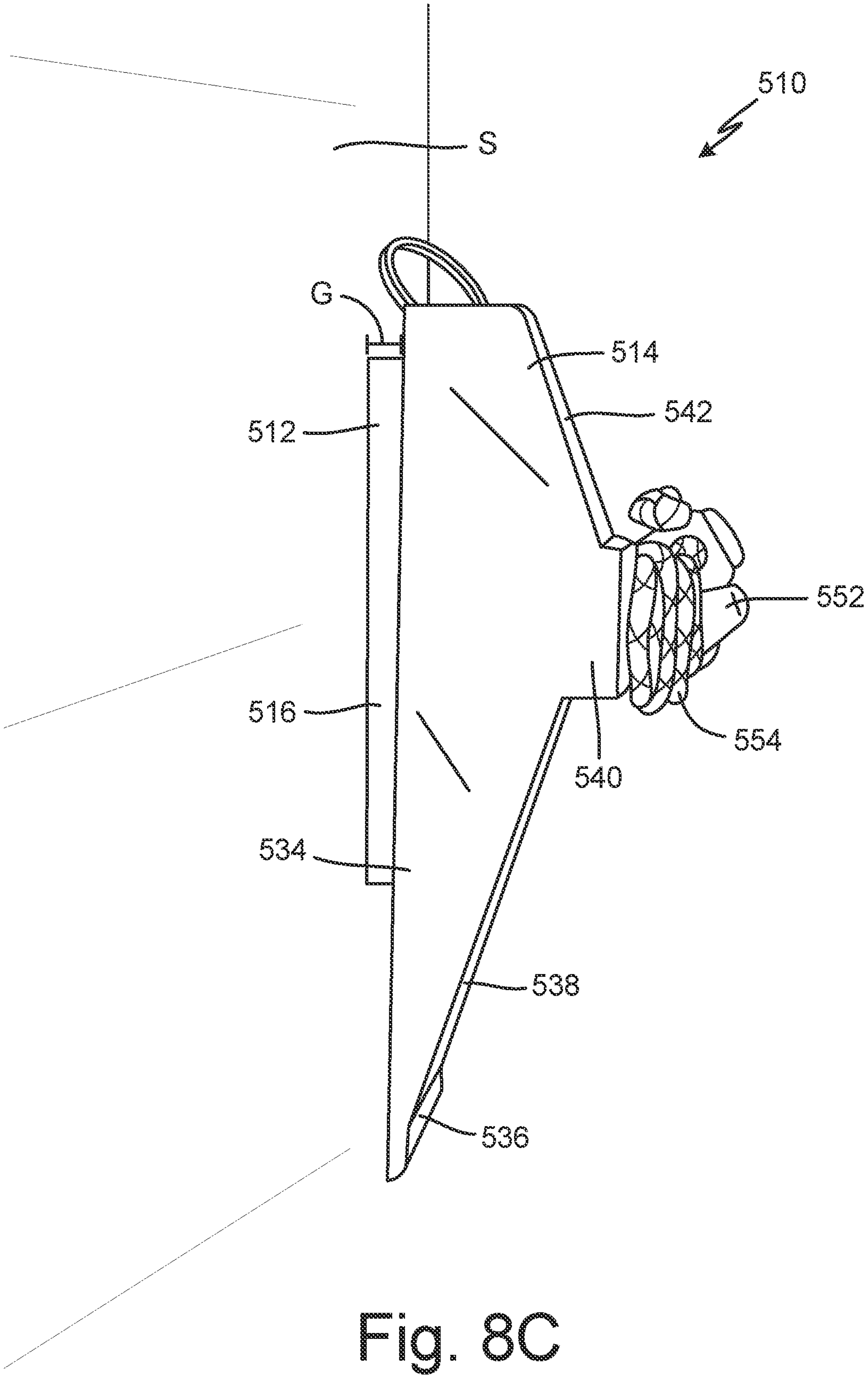
FIG. 8C is a side view of the doorstop on the doorstop mounting bracket.

FIG. 8A is a perspective view of doorstop storage system 510 including bracket 512 mounted on vertical surface S and doorstop 514 that can be stored on bracket 512. FIG. 8B is a cross-sectional view of doorstop 512 on bracket 514. The cross section is through doorstop 514 along a front face of bracket 512. FIG. 8C is a side view of doorstop 514 on bracket 512. FIGS. 8A-8C will be discussed together. Doorstop storage system includes bracket 512 and doorstop 514. Bracket 512 has body 516, first protrusion 518, second protrusion 520, primary hole 522, first alternate hole 524, and second alternate hole 526. First fastener 528, second fastener 530, and third fastener 532 are also part of doorstop storage system 510. Doorstop 514 includes foot 534 with lip portion 536, first sloped portion 538, pedestal portion 540, and second slope portion 542. Doorstop 514 also includes recess area 544, opening 546, first pocket 548, and second pocket 550. Doorstop 514 can optionally include cleat 552 and rope 554. FIGS. 8A-8C also include vertical surface S. FIG. 8C includes gap G.

Doorstop storage system 510 uses bracket 512 to removably store doorstop 514 against vertical surface S. Bracket 512 has generally the same structure and function as bracket 412 described with respect to FIG. 7, including body 516, first protrusion 518, second protrusion 520, primary hole 520, first alternate hole 522, second alternate hole 524, and vertical surface S. Doorstop 514 has generally the same structure and function as doorstop 110 and/or doorstop 210 described with respect to FIGS. 4A-5B, including includes foot 534, with lip portion 536, first sloped portion 538, pedestal portion 540, and second slope portion 542, recess area 544, opening 546, first pocket 548, second pocket 550, cleat 552, and rope 554. However, bracket 512 is designed to fit with doorstop 514 to securely it against vertical surface S and create gap G between a bottom of doorstop 514 and vertical surface S to ease removal of doorstop 514.

Storage system 510 has bracket 512 and doorstop 514 that are designed to fit into one another. Body 516 of bracket 512 fits tightly in recess area 544 of foot 534. First pocket 548 and second pocket 550 are in opposite sidewalls of foot 534 in recess area 544. First pocket 548 and second pocket 550 are aligned with one another and are open at the bottom of foot 534. First pocket 548 and second pocket 550 are sized and positioned to mate with first protrusion 518 and second protrusion 520.

Doorstop storage system 510 can be used to removably store doorstop 514 on vertical surface S using bracket 512. Removably storing doorstop 514 on vertical surface S includes a first step of mounting bracket 512 on vertical surface S. Mounting bracket 512 on vertical surface S can include using a combination of first fastener 528, second fastener 530, and third fastener 532 through primary hole 522, first alternate hole 524, and second alternate hole 526, respectively. Fasteners could be nails or screws and can also include wall anchors, depending on the nature of vertical surface S. For example, if vertical surface S is a hollow-core door or a hollow portion of a wall, then wall anchors with screws going into the wall anchors are an appropriate fastener choice. In another example, if vertical surface S is a solid-core door or a portion of a wall over a stud, then screws alone are an appropriate fastener choice. Bracket 512 should be firmly mounted onto vertical surface S such that removing doorstop 514 will not pull bracket 512 off vertical surface S.

A second step is positioning doorstop 514 over bracket 512 such that first pocket 548 and second pocket 550 are aligned with first protrusion 518 and second protrusion 520. First pocket 548 and second pocket 550 are the same size such that either first protrusion 518 can align with first pocket 548 or second protrusion 520 can align with first pocket 548. Similarly, second pocket 550 can align with either first protrusion 518 or second protrusion 520. In FIG. 7A, first pocket 548 is aligned with first protrusion 518 and lip portion 536 of foot 534 is near a bottom of bracket 512. However, first pocket 548 could align with second protrusion 520 and lip portion 536 could be near a top of bracket 512. However, it is possible to size first protrusion 518, second protrusion 520, first pocket 548, and second protrusion 550 such that doorstop 514 fits over bracket 512 in a certain direction. For example, first protrusion 518 and first pocket could be sized slightly larger than second protrusion 520 and second pocket 550 such that lip portion 536 is always oriented in the same direction when doorstop 514 is on bracket 512.

A third step is pushing doorstop 514 over bracket 512 until first protrusion 518 and second protrusion 520 are adjacent to ends of first pocket 548 and second pocket 550. Once doorstop 514 and bracket 512 are aligned, foot 534 of doorstop 514 can be pushed over bracket 512 such that body 516 of bracket 512 is positioned within recess area 544 of foot 534. First protrusion 518 and second protrusion 520 slide into first pocket 548 and second pocket 550 when doorstop 514 is pushed over bracket 512. Doorstop 514 will stop sliding over bracket 512 when first protrusion 548 and second protrusion 550 reach the ends of first pocket 548 and second pocket 550. When doorstop 514 is on bracket 512, first protrusion 548 and second protrusion 550 will not be visible because tips of first protrusion 518 and second protrusion 520 will be covered by sides of first pocket 548 and second pocket 550. When doorstop 514 is on bracket 512 such that first protrusion 518 and second protrusion 520 are adjacent with the ends of first pocket 548 and second pocket 550, there will be gap G between the bottom of foot 534 and vertical surface S. This space allows a place for a user to grip doorstop 514 when removing it from bracket 512.

A fourth step is pulling doorstop 514 away from bracket 512. When ready to use, doorstop 514 can be removed from bracket 512 by pulling doorstop 514 off bracket 512. Firmly gripping foot 534 and pulling doorstop 514 straight away from vertical surface S and bracket 512 releases doorstop 514. A fifth step is replacing doorstop 514 over bracket 512 to store doorstop 514. This can be done by repeating steps two and three.

Doorstop storage system 510 allows for easy and convenient storage of doorstop 514. Bracket 512 is lightweight and can be mounted on many different surfaces. Bracket 512 is also slim, so it is unobtrusive. Mounting bracket 512 on vertical surface S increases the amount of storage space available in an area because doorstop 514 will not have to be stored on the ground. Storing doorstop 514 on bracket 512 also reduces the chances of tripping on doorstop 514 when not in use. Further, storing doorstop 514 on vertical surface S reduces the amount someone would need to bend over to retrieve and use doorstop 514, reducing injuries from such repeated motion. Mounting bracket 512 can be mounted onto a door or on a wall near a door, meaning doorstop 514 will be conveniently located near a door when doorstop 514 is needed.

Figure 9:
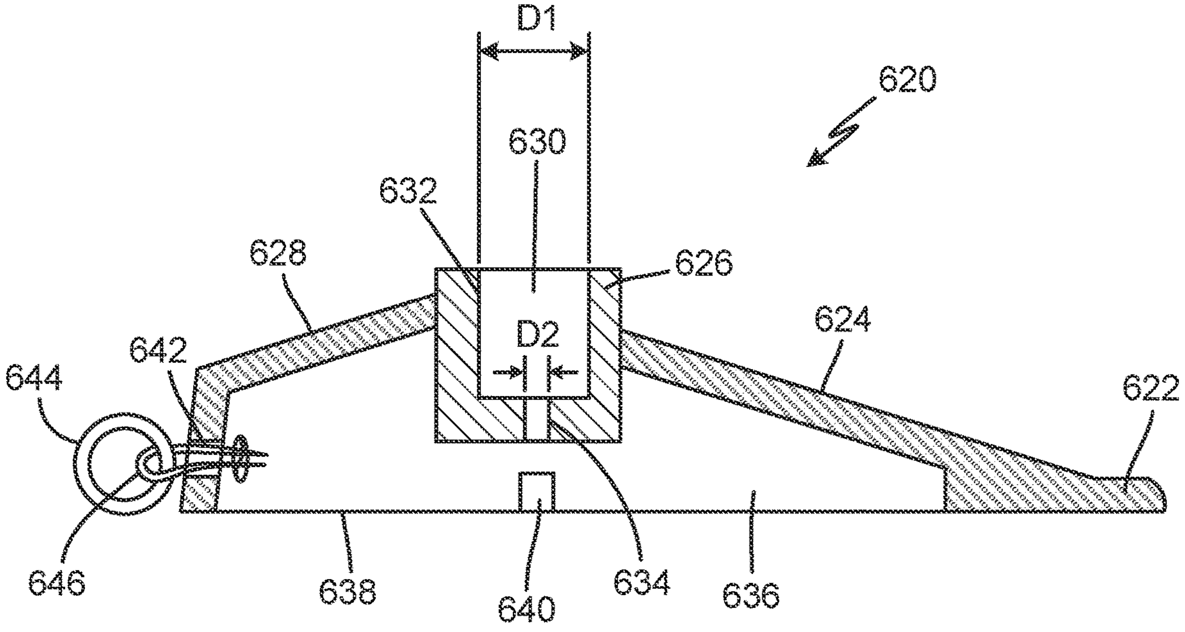
FIG. 9 is a cross section of a doorstop foot that can be used with interchangeable handle components.

FIG. 9 is a cross section of doorstop foot 620 that can be used with interchangeable handle components. Doorstop foot 620 includes lip portion 622, first sloped portion 624, pedestal portion 626, second sloped portion 628, and bore 630 with first portion 632 and second portion 634. Foot 620 also includes recess area 636, opening 638, pockets 640, hole 642, ring 644, and ring rope 646.

Foot 620 has lip portion 622, first sloped portion 624, pedestal portion 626, and second sloped portion 628. Lip portion 622 is at a first end of foot 620. Lip portion 622 is a thin, flat portion of foot 620 and about one-eighth inch thick. First sloped portion 624 attaches to lip portion 622. Pedestal portion 626 attaches to first sloped portion 624 opposite where lip portion 622 is attached. Pedestal portion 626 is between first sloped portion 624 and second sloped portion 628. Second sloped portion 628 is near a second end of foot 620. Pedestal portion 626 is elevated from first sloped portion 624 and second sloped portion 628.

Bore 630 extends through pedestal portion 626 into foot 620. Bore 630 is positioned in a middle of pedestal portion 626. Bore 630 has first portion 632 and second portion 634. First portion 632 is a top of bore 630 and is adjacent to a top of pedestal portion 626. First portion 632 is first diameter D1. Second portion 634 is below first portion 632 and located near a radial center of a lower side of first portion 632. Second portion 634 is second diameter D2. First diameter D1 is larger than second diameter D2. Diameter D2 is sized to receive a screw.

Foot 620 also includes recess area 636, opening 638, pockets 640, hole 642, ring 644, and ring rope 646. Recess area 636 is in foot 620 under first sloped portion 624, pedestal portion 626, and second sloped portion 628. Opening 638 is in a bottom surface of foot 620 around recess area 636. Pockets 640 are in opposite sides of recess area 636 and extend to the bottom surface of foot 620. Pockets 640 are aligned with one another under pedestal portion 626. Pockets 640 are generally rectangular and have a depth between 0.55 centimeters and 0.65 centimeters. Preferably, pockets are 0.6 centimeters deep, measured from the bottom surface of foot 620 to ends of pockets 640 within recess area 636. Hole 642 is through the second end of foot 620 near second sloped portion 628. Hole 642 extends into recess area 636. Ring 644 is attached to the second end of foot 620 with ring rope 646. Ring rope 646 loops around ring 644 and ends of ring rope 646 extend into recess area 636 and are knotted to hold ring 644 onto foot 620.

Foot 620 is part of a doorstop designed to be positioned by a user on a floor under a lower edge of a door to hold the door in place. Foot 620 can be wedged under the door to hold the door in place. Lip portion 622 eases positioning foot 620 under a door with a small gap between the door and a flooring underneath the door. Foot 620 can have a handle attached through bore 630 to help a user position foot 620 without bending over. Multiple types of handles can be attached to foot 620 through bore 630, including a shaft with a magnet, a cleat, or a shaft-type handle. First portion 632 is sized to fit an insert to attach the handle to foot 620. Second portion 634 is sized to fit a fastener, such as a screw, to secure the insert and/or the handle to foot 620. Ring 644 allows for foot 620 to be carried hands-free by attaching ring 644 onto a key clip or other storage hook.

Foot 620 is designed so a user can assemble and disassemble a doorstop with a handle utilizing foot 620. Should foot 620 break, the user can remove the handle and attach the handle to a new foot 620. Alternatively, a user can attach a different type of handle or a different handle to foot 620 should the handle break. Foot 620 reduces consumer cost for a doorstop system because the consumer can replace only the broken parts of the doorstop rather than the whole product. Foot 620 can be used with multiple handles, reducing the number of pieces a manufacturer need produce or stock.

Figure 10:
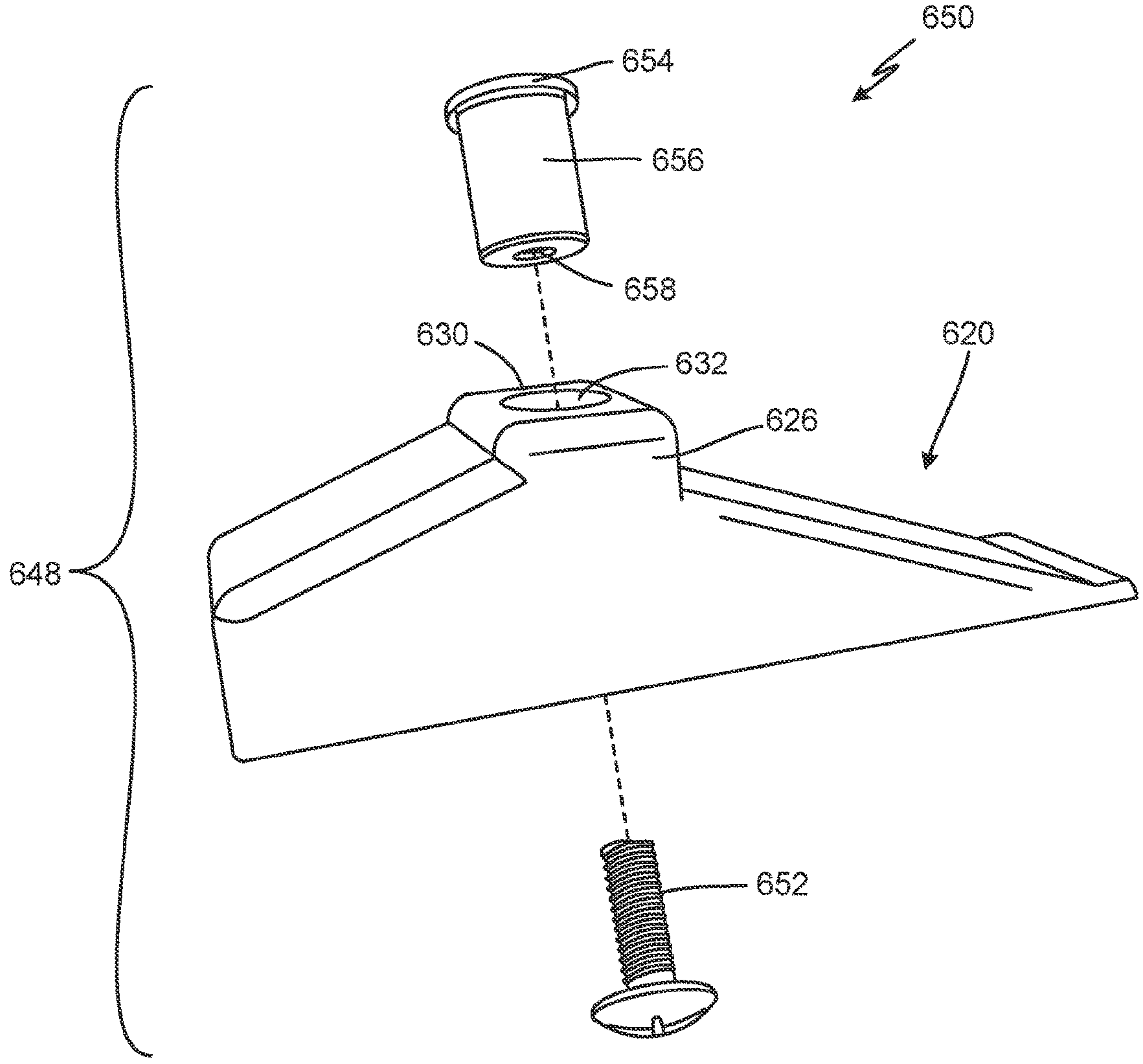
FIG. 10 is an exploded view of a doorstop with a metal insert inside the doorstop foot.

FIG. 10 is an exploded view of doorstop 648 with metal insert 650 in foot 620. Doorstop 648 includes foot 620, metal insert 650, and fastener 652. Doorstop foot 620 includes pedestal portion 626 and bore 630 with first portion 632 and second portion 634 (shown in FIG. 9). Metal insert 640 includes disk portion 654, cylinder portion 656, and pilot hole 658.

Foot 620 has generally the same structure and function as foot 620 described with respect to FIG. 9, including pedestal portion 626 and bore 630 with first portion 632 and second portion 634. Doorstop 648 has metal insert 650 placed into first portion 632 of bore 630 in doorstop 620. Fastener 652 is positioned in second portion 634 of bore 630 in foot 620. Fastener 652 holds metal insert 650 and foot 620 together. Fastener 652 can be any appropriate type of fastener, such as a screw. A portion of fastener 652 will sit in recess area 636 (shown in FIG. 9) when doorstop 648 is assembled. For example, if fastener 652 is a screw, a head of the screw will be in recess area 636 when doorstop 648 is assembled.

Metal insert 650 (or plug) includes disk portion 654, cylinder portion 656, and pilot hole 658. Disk portion 654 is a top of metal insert 650. Disk portion 654 has a diameter that is slightly larger than diameter D1 of first portion 632 of bore 630. When metal insert 650 is inside bore 630, disk portion 654 rests on a top of pedestal portion 626. Cylinder portion 656 extends from one face of disk portion 654. Cylinder portion 656 has a diameter smaller than disk portion 654 and is sized to fit in top portion 632 of bore 630 in foot 620. As such, cylinder portion 656 is slightly smaller than diameter D1 of first portion 632 of bore 630. Pilot hole 658 extends into a bottom of metal insert 650, opposite disk portion 654. Pilot hole 658 is near a center of cylinder portion 656 and aligned with second portion 634 of bore 630. Pilot hole 658 receives fastener 652. Pilot hole 658 can be configured in different ways depending what type of fastener is being used. For example, if fastener 652 is a screw, pilot hole 658 will be threaded. Metal insert 650 is made of a material that attracts a magnet, like ferromagnetic metals including iron and nickel.

Metal insert 650 fits into first portion 632 of bore 630 from the top of pedestal portion 626. Fastener 652 fits into second portion 634 of bore 630 via recess area 636 (shown in FIG. 9) and is positioned into pilot hole 658 to hold foot 620 and metal insert 650 together. Doorstop 648 can be used with a magnetic handle, such as a telescoping handle with a magnet on one end or a shaft-type handle with a magnet on one end. The telescoping handle can be in a compressed position or an extended position. The compressed position is smaller than the extended position to allow for easy carrying in a pocket. The extended position is long enough to retrieve doorstop 648 from a standing position, about 3-4 feet long. The magnet attaches to disk portion 654 of metal insert 650. The magnet should be around a 12-pound magnet, meaning the magnet requires around 12 pounds of force to separate it from a metal component. With the magnetic handle attached, a user can position and retrieve foot 620 without bending over, thereby reducing the likelihood of repetitive motion injuries.

Doorstop 648 is designed to be disassembled to replace broken pieces. Foot 620 often wears out before metal insert 650, fastener 652, or the magnetic handle. Assembly of metal insert 650 into foot 620 with fastener 652 allows for removal of metal insert 650 and fastener 652 from a broken foot 620. Metal insert 650 and fastener 652 can then be assembled into a replacement foot 620. This saves consumers money because a replacement doorstop 648 is the cost of the replacement foot 620 rather than having to buy a new doorstop 648.

Figure 11:
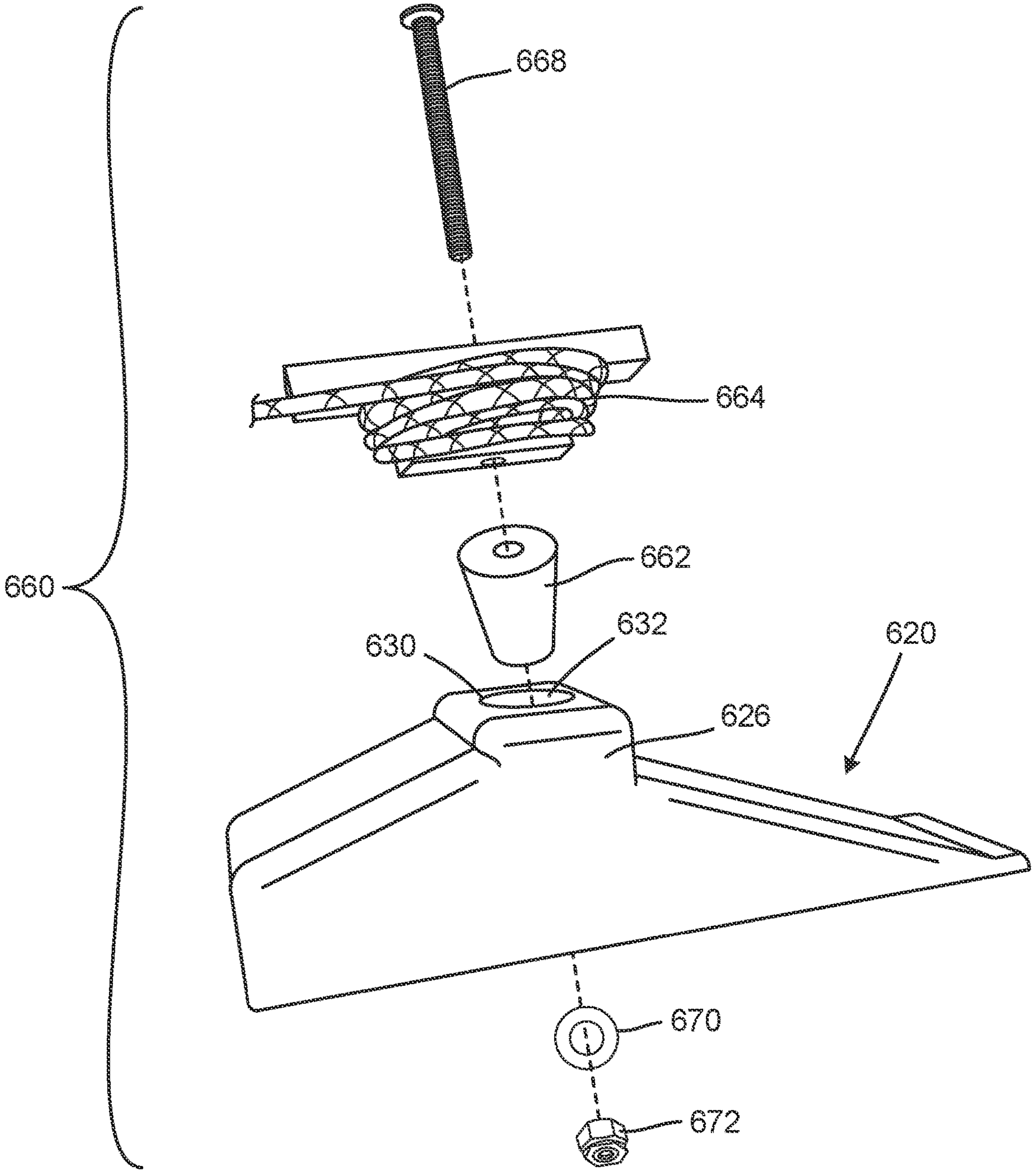
FIG. 11 is an exploded view of a doorstop with the doorstop foot and a cleat.

FIG. 11 is an exploded view of doorstop 660 with foot 620 and cleat 664. Doorstop 660 includes foot 620 (with pedestal portion 626 and bore 630 with first portion 632 and second portion 634 (shown in FIG. 9)), anchor insert 662, cleat 664, screw 668, washer 670, and nut 672.

Foot 620 has generally the same structure and function as foot 620 described with respect to FIG. 9, including pedestal portion 626 and bore 630 with first portion 632 and second portion 634 (shown in FIG. 9). In doorstop 660, anchor insert 662 fits into first portion 632 of bore 630 in pedestal portion 626 of foot 620. Anchor insert 662 includes a bore that aligns with second portion 634 of bore 630. Cleat 664 is positioned on top of anchor insert 662 and a top of pedestal portion 626 of foot 620. Cleat 664 has a bore that aligns with the bore in anchor insert 662 and second portion 634 of bore 630 in foot 620.

Screw 668, washer 670, and nut 672 are fasteners used to hold doorstop 660 together. Screw 668 is long enough to extend through the bore in cleat 664, the bore in anchor insert 662 and bore 630 in foot 620. A tip of screw 668 extends into recess area 636 (shown in FIG. 9) of foot 620. Washer 670 threads onto the tip of screw 668 in recess area 636. Nut 672 threads onto the tip of screw 668 and holds doorstop 660 together.

Doorstop 660 has generally the same structure and function of doorstop 110 with respect to FIGS. 4A-4B, including foot 620, cleat 664, screw 668, and nut 672. Anchor insert 662 resizes first portion 632 of bore 630 in foot 620 such that screw 668 will be securely seated through doorstop 660. Cleat 664 is a cleat-style handle for doorstop 660. Cleat 664 includes a rope with a loop in the rope. The rope can be used to position and retrieve foot 620 without a user having to bend over, thereby reducing the likelihood of repetitive motion injuries.

Like doorstop 648 discussed in FIG. 10, doorstop 660 is designed to be disassembled to replace broken pieces. Foot 620 often wears out before anchor insert 662, cleat 664, screw 668, washer 670, or nut 672. Doorstop 660 allows for replacement of broken parts. This saves consumers money because replacing foot 620, cleat 664, or any individual component of doorstop 660 is less expensive than replacing an entire doorstop.

Figure 12:
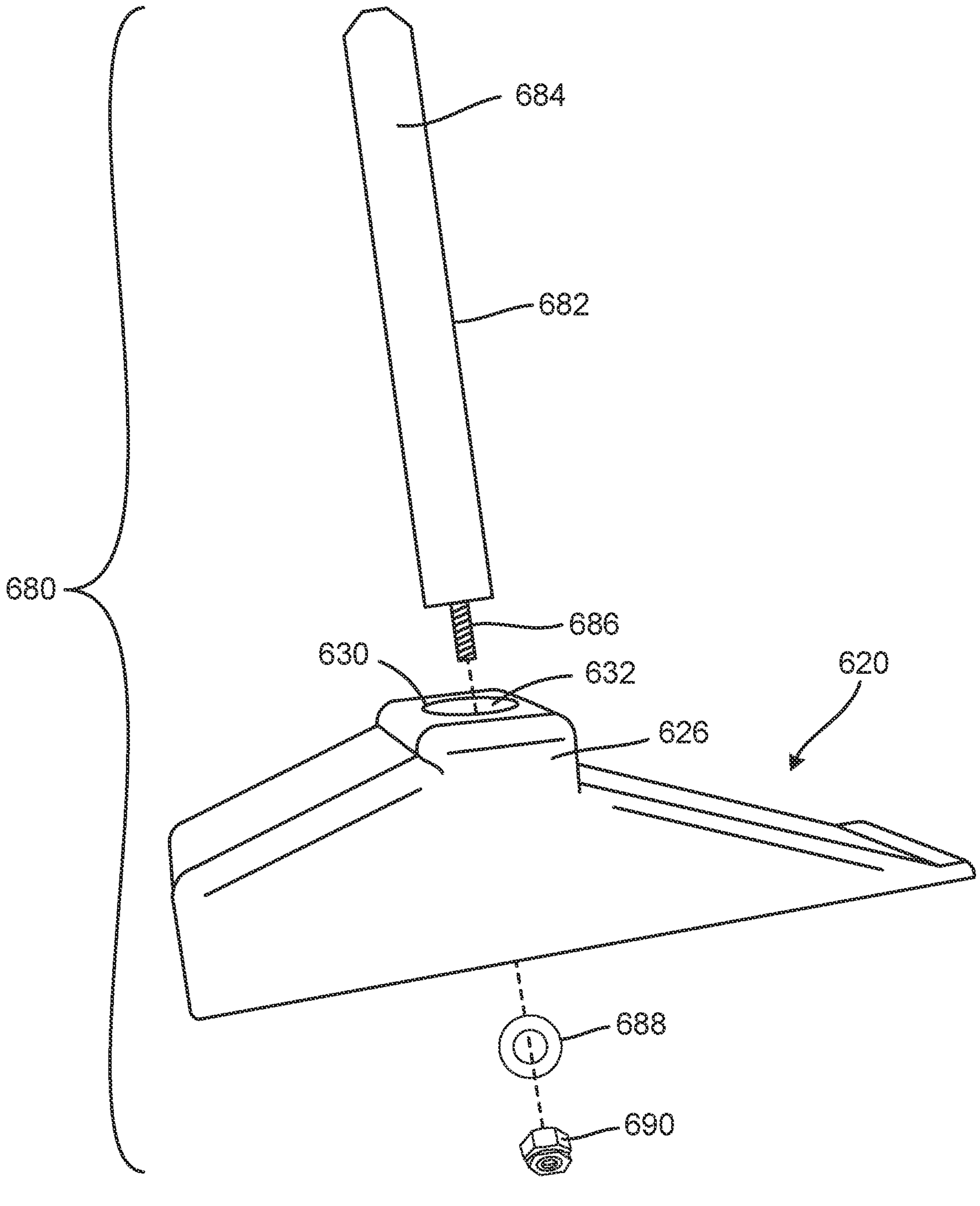
FIG. 12 is an exploded view of a doorstop with the foot and a shaft-type handle.

FIG. 12 is an exploded view of doorstop 680 with foot 620 and shaft-type handle 682. Doorstop 680 includes foot 620 with pedestal portion 626 and bore 630 with first portion 632 and second portion 634 (shown in FIG. 9). Doorstop 680 also includes handle 682 with handle shaft portion 684 and handle fastener portion 686, washer 688, and nut 690.

Foot 620 has generally the same structure and function as foot 620 described with respect to FIG. 9, including pedestal portion 626 and bore 630 with first portion 632 and second portion 634 (shown in FIG. 9). Handle 682 is a shaft-type handle that includes shaft portion 684 and fastener portion 686. Shaft portion 684 is long enough to reach a floor while a user is holding it and standing, about three to four feet long. Fastener portion 686 extends from one end of shaft portion 684. The end of shaft portion 684 with fastener portion 686 is approximately diameter D1, so the end of the shaft can fit into first portion 632 of bore 630. Shaft portion 684 can be approximately diameter D1 along its length or the end with fastener portion 686 can taper to diameter D1. The end of handle 682 near fastener portion 686 is an insert and fits into first portion 632 of bore 630 in foot 620. Fastener portion 686 is in second portion of bore 634. A tip of fastener portion 686 extends into recess area 636. In doorstop 680, fastener portion 686 is a threaded screw. Washer 688 threads onto fastener portion 686 within recess area 636 and nut 690 threads onto fastener portion 686 to secure washer 688, foot 620, and handle 682 together. If fastener portion 686 is another type of fastener, washer 688 and nut 690 can be changed to mate with fastener portion 686

Doorstop 680 is designed to be positioned without a user having to stoop or bend over. Handle 682 is long enough that a user can grab it while standing and move foot 620 under a door or away from the door. This reduces the need for repetitive bending or stooping to position doorstop 680 and reduces the likelihood of injure from repetitive motion. Doorstop 680 is designed to be easily disassembled and reassembled by the user, so that broken components can be individually replaced. For example, should foot 620 break but handle 684 remain usable, the user can remove nut 690, washer 688, and handle 682 from the broken foot 620 and replace it with a new foot 620. In another example, should handle 684 break, doorstop 680 can be disassembled and a new handle 684 can replace the broken one. This reduces the cost of replacing a broken doorstop 680.

FIGS. 9-12 represent a doorstop system that a consumer can use to replace broken doorstop components economically. As discussed in relation to FIGS. 9-12, a handle, such as a shaft with a magnet, cleat 664, or handle 682, can be removed from a broken foot 620 and placed into a new foot 620. Alternatively, a broken handle can be removed from foot 620 and replaced with a new handle. In a third alternative, one type of handle can be removed from foot 620 and replaced with a new type of handle. For example, a doorstop with handle 682 in foot 620 could be rebuilt to have cleat 684 as a handle instead.

Changing a handle on a doorstop requires removing a first fastener from a doorstop foot, like foot 620. In the case of doorstop 648, fastener 658 should be removed from metal insert 650. With doorstop 660, nut should be unscrewed from fastener 668 and washer 670 and removing fastener 668 (a screw in this example) from bore 630. When fastener 668 is removed, cleat 664 is no longer secured to foot 620 and can also be removed. In doorstop 680, fastener portion 686 is a screw and nut 690 should be removed from fastener portion 686.

Next, a user should remove a first insert from a bore in the doorstop foot. With doorstop 648, metal insert 650 should be removed from first portion 632 of bore 630. Doorstop 660 requires removal of rubber anchor insert 662 from first portion 632 of bore 630 in foot 620. With doorstop 680, removal of handle 682 removes a bottom of shaft portion 684 (an insert portion) from first portion 632 of bore 630 in foot 620. After this step, foot 620 has no handle or insert and can be replaced. Alternatively, a new handle (of the same type or a different type) can be placed into foot 620.

A third step in changing a handle on a doorstop includes placing a second insert into the bore in the doorstop foot. The second insert can be the same insert, the same type of insert, a different insert, or a different type of insert as the first insert. When assembling doorstop 648, metal insert 650 needs to be placed into portion 632 of bore 630 of foot 620. With doorstop 660, rubber anchor insert 662 should be placed into first portion 632 of bore 630. With doorstop 680, a bottom portion of shaft portion 684 should be placed into first portion 632 of bore 630.

A fourth step includes placing a second fastener onto the doorstop to hold the second insert into the foot. When assembling doorstop 648, fastener 658 should be placed into second portion 634 of bore 630 in foot 620 and fastened into pilot hole 656 in metal insert 650. To assemble doorstop 660, fastener 668 must be placed through a bore in a bore in cleat 664, a bore in rubber anchor insert 662, bore 630 of foot 620. In the case where fastener 668 is a screw, washer 670 and nut 672 should then be secured onto fastener 668. With doorstop 680, fastener portion 686 is already in second portion 634 of bore 630. In one example, fastener portion 686 is a screw and washer 688 and nut 690 should be threaded onto fastener portion 686.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A doorstop comprising:
a foot;
a cleat mounted on a top of the foot, the cleat comprising:
a standoff with a first side attached to the top surface of the foot; and a crossbar extending perpendicularly across a second side of the standoff;
a rope having a first end connected to the cleat, wherein the rope can be wound around the cleat; and
a primary loop formed from a second end of the rope.

2. The doorstop of claim 1, wherein the rope has a length that is long enough to allow the primary loop to be positioned on a doorhandle of a door while the foot is wedged under the door.

3. The doorstop of claim 2, wherein the rope is between 42 inches (106 centimeters) and 50 inches (127 centimeters) long.

4. The doorstop of claim 1, wherein a screw extends through the cleat and into the foot.

5. The doorstop of claim 4, wherein the screw extends through the foot and into a recess area within the foot, and wherein a nut is threaded onto a tip of the screw to hold the cleat and the foot together.

6. The doorstop of claim 1, and further comprising:
a rope lock mounted on the rope to form the primary loop, wherein the rope lock is adjustable to vary size of the primary loop.

7. The doorstop of claim 6, wherein the rope lock is a spring-loaded plastic push button lock with a first passage and a second passage, and wherein the first end of the rope extends through the first passage and the second passage to form the primary loop.

8. The doorstop of claim 1, wherein the foot includes:
a first sloped portion at a first end of the foot;
a second sloped portion at an opposite, second end of the foot; and
a pedestal portion located between the first sloped portion and the second sloped portion, wherein the cleat is mounted on a top surface of the pedestal portion.

9. The doorstop of claim 8, wherein the foot further includes:
a lip portion that extends outward from the first sloped portion at the first end of the foot.

10. The doorstop of claim 1, wherein the rope is a braided nylon rope.

11. The doorstop of claim 10 wherein the first end of the rope has a first knot, and wherein the second end of the rope has a second knot.

12. The doorstop of claim 10, wherein the first end of the rope is welded to keep the first end of the rope from fraying, and wherein the second end of the rope is welded to keep the second end of the rope from fraying.

13. A doorstop comprising:
a foot;
a cleat mounted on the foot;
a rope having a first end connected to the cleat, wherein the rope can be wound around the cleat;
a primary loop formed from a second end of the rope;
a ring connected to the foot; and
a belt key clip removably attached to the ring to allow the doorstop to be carried hands-free.

14. The doorstop of claim 13, wherein the ring is connected to the foot by a second rope, wherein the second rope comprises:

a secondary loop extending through the foot, wherein the ring is threaded onto the secondary loop; and a knot inside a recess area within the foot.

15. A doorstop comprising:

a foot;

a rope with a first end connected to the foot;

a rope lock mounted on a second end of the rope and forms a loop at the second end of the rope; and a cleat mounted on the foot, around which the rope can be wound.

16. A doorstop comprising:

a foot;

a cleat mounted on the foot;

a rope with a first end threaded through the cleat and the foot;

a rope lock mounted on the rope forming a primary loop at a second end of the rope; and a ring held adjacent to the foot by the first end of the rope.

17. The doorstop of claim 16, and further comprising:

a recess area within the foot;

a bore through the cleat and the foot into the recess area, wherein the first end of the rope is threaded through the bore;

a knot near the first end of the rope, wherein the knot forms a secondary loop at the second end of the rope;

a hole through a side of the foot, wherein the secondary loop extends through the hole, and wherein the ring is threaded through the secondary loop with the ring outside of the foot.

18. The doorstop of claim 17, wherein the knot is a welded knot to prevent fraying.

* * * * *